(12) United States Patent
Mizuno

(10) Patent No.: US 9,202,154 B2
(45) Date of Patent: Dec. 1, 2015

(54) INFORMATION PROCESSING APPARATUS AND METHOD FOR CONTROLLING RE-EXECUTION OF PRINT JOBS, AND STORAGE MEDIUM

(71) Applicant: CANON KABUSHIKI KAISHA, Tokyo (JP)

(72) Inventor: Takafumi Mizuno, Higashimurayama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/927,260

(22) Filed: Jun. 26, 2013

(65) Prior Publication Data

US 2014/0002847 A1     Jan. 2, 2014

(30) Foreign Application Priority Data

Jun. 29, 2012 (JP) ................. 2012-147595

(51) Int. Cl.
*G06K 15/00*     (2006.01)
*G06K 15/02*     (2006.01)

(52) U.S. Cl.
CPC ........ *G06K 15/4095* (2013.01); *G06K 15/1817* (2013.01); *G06K 15/002* (2013.01)

(58) Field of Classification Search
CPC .......... G06K 15/4095; G06K 15/1817; G06K 15/002
USPC ................................... 358/1.1–3.29
See application file for complete search history.

(56) References Cited

U.S. PATENT DOCUMENTS

| | | | | |
|---|---|---|---|---|
| 2006/0023247 | A1* | 2/2006 | Yamakawa | 358/1.14 |
| 2007/0201091 | A1* | 8/2007 | Tanaka | 358/1.16 |
| 2008/0055660 | A1* | 3/2008 | Tsuzuki | 358/400 |
| 2009/0279133 | A1* | 11/2009 | Nakatsuka | 358/1.15 |
| 2012/0218588 | A1* | 8/2012 | Nakata | 358/1.14 |

FOREIGN PATENT DOCUMENTS

| | | |
|---|---|---|
| JP | 2006-056109 A | 3/2006 |
| JP | 2007-243621 A | 9/2007 |

* cited by examiner

*Primary Examiner* — Marcellus Augustin
(74) *Attorney, Agent, or Firm* — Carter, DeLuca, Farrell & Schmidt, LLP

(57) ABSTRACT

When a user instructs re-execution of a print job based on history information of the executed print job, even if user information of the history information of the print job does not correspond to user information of the user who instructed re-execution of the print job, if authentication of the user who instructed the re-execution of the print job succeeds, the print job is re-executed based on the history information of the print job.

7 Claims, 16 Drawing Sheets

FIG. 4A

| 401 | 402 | 403 | 404 | 405 | 406 |
|---|---|---|---|---|---|
| JOB TYPE | DATE/TIME | USER ID | PRINT SETTINGS SAVE DESTINATION | PRINTING IMAGE DATA SAVE DESTINATION | EXTERNAL FILE ATTRIBUTE ID |
| COPY | 2011. 1.3 10:24:14 | yamada | 00102.setting | 00102.img | - |
| PDL | 2011. 1.4 8:47:52 | suzuki | 00108.setting | 00108.img | - |
| FILE | 2011. 1.4 17:33:29 | arai | 00111.setting | 00111.img | - |
| NET | 2011. 1.5 14:27:17 | suzuki | 00135.setting | 00135.img | 28 |

FIG. 4B

| 407 | 408 | 409 | 410 | 411 | 412 | 413 |
|---|---|---|---|---|---|---|
| ID | REFERENCED URL | PROTOCOL | UPDATE DATE/TIME | FILE SIZE | USER INFORMATION | GROUP |
| 28 | ¥¥192.168.3.5¥share¥a.pdf | CIFS | 2010.9.8 09:51:03 | 30291 byte | ID = suzuki | sales-dept. Sapporo office |

FIG. 5A

| | JOB TYPE | DATE/TIME | USER ID | PRINT SETTINGS SAVE DESTINATION | PRINTING IMAGE DATA SAVE DESTINATION | EXTERNAL FILE ATTRIBUTE ID |
|---|---|---|---|---|---|---|
| 501 | COPY | 2011. 1.3 10:24:14 | yamada | 00102.setting | 00102.img | — |
| 502 | PDL | 2011. 1.4 08:47:52 | suzuki | 00108.setting | 00108.img | — |
| 503 | NET | 2011. 1.5 17:33:29 | yamada | 00111.setting | 00111.img | 28 |
| 504 | PDL | 2011. 1.25 14:27:17 | arai | 00135.setting | 00135.img | — |
| 505 | COPY | 2011. 2.1 12:59:48 | yamada | 00139.setting | 00139.img | — |
| 506 | NET | 2011. 2.2 07:36:12 | murata | 00162.setting | 00162.img | 29 |

FIG. 5B

| | ID | REFERENCED URL | PROTOCOL | UPDATE DATE/TIME | FILE SIZE | USER INFORMATION | GROUP |
|---|---|---|---|---|---|---|---|
| 507 | 28 | ¥¥192.168.3.5¥share¥a.pdf | CIFS | 2010.9.8 09:51:03 | 30291 byte | ID = taro | sales-dept. Tokyo head office |
| | 29 | http://192.168.41.82/users/b.tiff | WebDAV | 2011.1.10 21:23:53 | 8287 byte | ID = murata | accounting-dept. Osaka office |

F I G. 11B
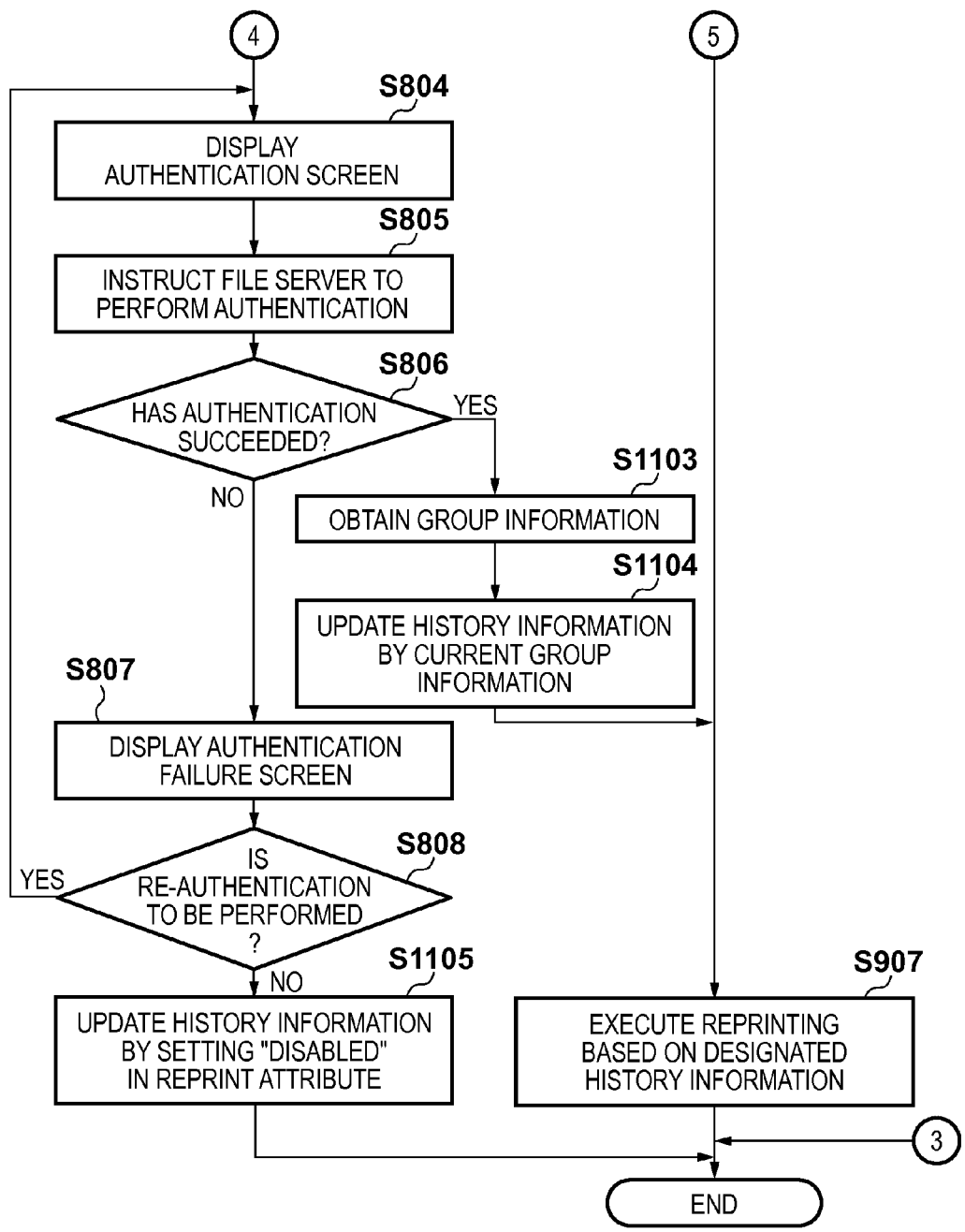

FIG. 12

| | JOB TYPE | DATE/TIME | USER ID | PRINT SETTINGS SAVE DESTINATION | PRINTING IMAGE DATA SAVE DESTINATION | EXTERNAL FILE ATTRIBUTE ID | REPRINT ATTRIBUTE |
|---|---|---|---|---|---|---|---|
| 1202 | COPY | 2011. 1.3 10:24:14 | yamada | 00102.setting | 00102.img | — | "ENABLED" |
| 1203 | PDL | 2011. 1.4 08:47:52 | suzuki | 00108.setting | 00108.img | — | "ENABLED" |
| 1204 | NET | 2011. 1.5 17:33:29 | yamada | 00111.setting | 00111.img | 28 | "ENABLED" |
| 1205 | PDL | 2011. 1.25 14:27:17 | arai | 00135.setting | 00135.img | — | "ENABLED" |
| 1206 | COPY | 2011. 2.1 12:59:48 | yamada | 00139.setting | 00139.img | — | "DISABLED" |
| 1207 | NET | 2011. 2.2 07:36:12 | murata | 00162.setting | 00162.img | 29 | "RESTRICTED" |

| JOB TYPE | DATE/TIME | USER ID | PRINT SETTINGS SAVE DESTINATION | PRINTING IMAGE DATA SAVE DESTINATION | EXTERNAL FILE ATTRIBUTE ID |
|---|---|---|---|---|---|
| COPY | 2011.1.3 10:24:14 | yamada | 00102.setting | 00102.img | — |
| PDL | 2011.1.4 08:47:52 | suzuki | 00108.setting | 00108.img | — |
| NET | 2011.1.5 17:33:29 | yamada | 00111.setting | — | 28 |
| PDL | 2011.1.25 14:27:17 | arai | 00135.setting | 00135.img | — |
| COPY | 2011.2.1 12:59:48 | yamada | 00139.setting | 00139.img | — |
| NET | 2011.2.2 07:36:12 | murata | 00162.setting | — | 29 |

| ID | REFERENCED URL | PROTOCOL | UPDATE DATE/TIME | FILE SIZE | USER INFORMATION | GROUP |
|---|---|---|---|---|---|---|
| 28 | ¥¥192.168.3.5¥share¥a.pdf | CIFS | 2010.9.8 09:51:03 | 30291 byte | ID = taro Password=xxxx | sales-dept. Tokyo head office |
| 29 | http://192.168.41.82/users/b.tiff | WebDAV | 2011.1.10 21:23:53 | 8287 byte | ID = murata Password=yyyy | accounting-dept. Osaka office |

1402

INFORMATION PROCESSING APPARATUS AND METHOD FOR CONTROLLING RE-EXECUTION OF PRINT JOBS, AND STORAGE MEDIUM

BACKGROUND OF THE INVENTION

1. Field of the Invention

The present invention relates to an information processing apparatus and a method of controlling the same, and a storage medium.

2. Description of the Related Art

Recent image forming apparatuses have a pull print function capable of accessing a device such as a file server on a network, and obtaining and printing document data stored in the device. Assume that document data stored in a file server is protected by a right. In this case, a user of an image forming apparatus performs authentication. Only if the user has a right to print the document data, he/she can print the document data in the file server. Such a right can be set for not only a specific user but also a group to which a user belongs.

Furthermore, some image forming apparatuses have a reprint function of reprinting data which has been already printed. For example, Japanese Patent Laid-Open No. 2006-056109 describes a technique of recording a print history of a file server in an IC card or the like, and reprinting data contained in the print history. Moreover, Japanese Patent Laid-Open No. 2007-243621 describes a technique of referring to the security policy of the original electronic document of a scanned document, and determining whether the document can be scanned, copied, or the like, thereby reusing the original electronic document.

The former conventional technique does not confirm a right for data to be reprinted. The latter conventional technique obtains the security policy of the original electronic document of the scanned document, and determines whether to reuse the scan data of the document but does not describe a right for data of history information. In the conventional techniques above, even if a group to which the user belonged when initially printing data is different from that to which the user belongs when instructing reprinting of the data using a print history, the user can reprint the data.

Assume, for example, that a user belonging to a sales department prints, using an image forming apparatus, data in a file server, for which an access right has been set for only the sales department. In this case, history information of this print processing is saved in the image forming apparatus. After that, if the user is transferred from the sales department to a personnel department, the group to which the user belongs is changed from the sales department to the personnel department. In this state, if the user instructs reprinting of the previously printed data using the history information of the image forming apparatus, he/she can reprint the data even though the access right of the data has been set for only the sales department.

SUMMARY OF THE INVENTION

An aspect of the present invention is to eliminate the above-mentioned problems with the conventional technology.

A feature of the present invention is to provide the following technique. That is, if user information of a user who executed a print job has been changed, re-execution of the print job is properly controlled based on history information of the print job.

According to an aspect of the present invention, there is provided an information processing apparatus comprising: an obtaining unit configured to obtain a file from a file server in response to an instruction by an authenticated user; an execution unit configured to execute a print job based the file obtained by the obtaining unit; a storage unit configured to store history information of the print job executed by the execution unit; and a control unit configured to control to re-execute the print job based on the history information in a case that user information of the history information does not correspond to user information of a user who instructed re-execution of the print job and authentication of the user who instructed the re-execution of the print job succeeds.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B depict views illustrating examples of a history management table stored in a history manager according a first embodiment;

FIGS. 5A and 5B depict views illustrating examples of a history management table stored in the history manager according to the first embodiment;

FIGS. 11A and 11B are flowcharts for describing processing which is executed by the image forming apparatus according to the second embodiment when the user instructs reprinting based on history information;

FIG. 12 depicts a view illustrating an example of a history management table according to the second embodiment;

FIGS. 14A and 14B depict views illustrating examples of a history management table according to a third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
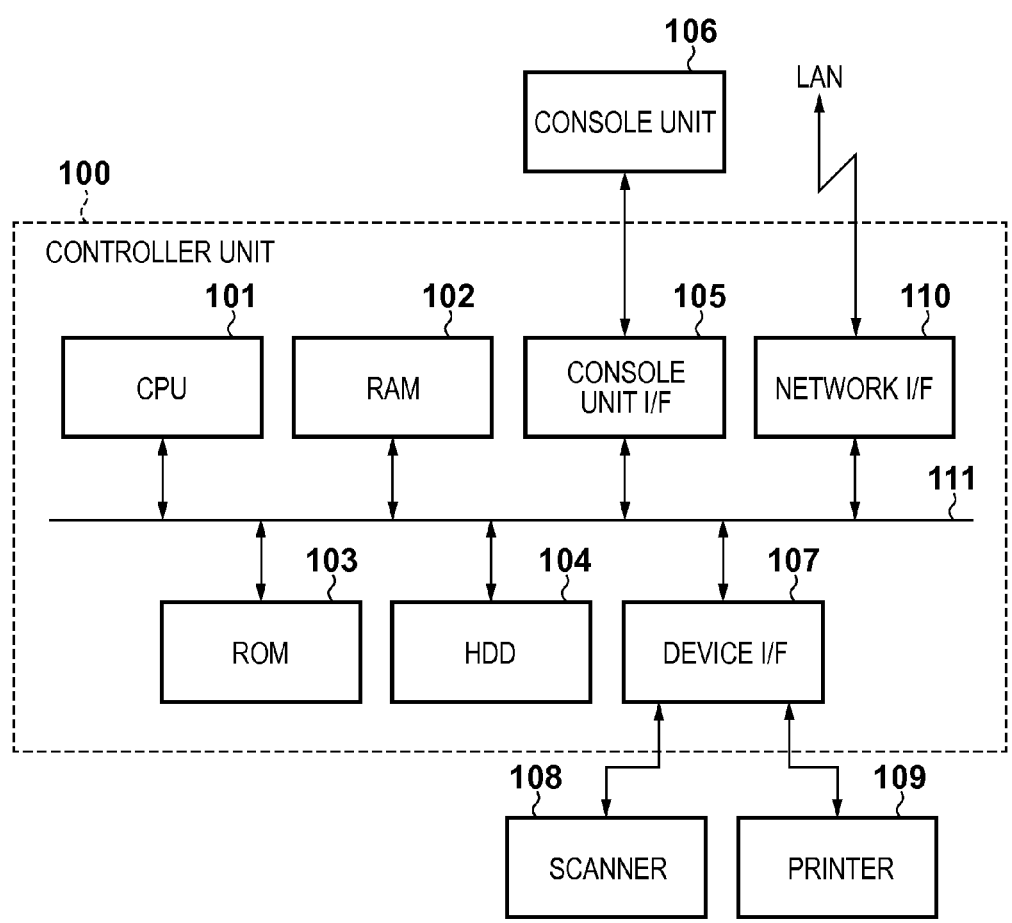
FIG. 1 is a block diagram showing the arrangement of an image forming apparatus according to an embodiment.

FIG. 1 is a block diagram showing the arrangement of an image forming apparatus 202 (FIG. 2) according an embodiment. This image forming apparatus 202 will be exemplified by a multi-functional processing apparatus (multi-function peripheral) having a scan function, a print function, a box function, and the like. The present invention, however, is not limited to this, and is also applicable to a printer having only a print function or the like.

A controller unit 100 controls the overall operation of the image forming apparatus 202. A CPU 101, a RAM 102, a ROM 103, an HDD 104, a console unit I/F 105, a device I/F 107, and a network I/F 110 are connected to a system bus 111. The CPU 101 comprehensively controls each unit connected to the system bus 111 according to a program deployed on the RAM 102. The RAM 102 serves as a work memory for operating the CPU 101, and serves as an image memory for temporarily storing image data. The RAM 102 also stores programs such as an operating system, system software, and application software. The ROM 103 stores a boot program for reading out a program installed in the HDD 104 and deploying the readout program on the RAM 102 upon power-on. The ROM 103 may store information such as a font necessary for the image forming apparatus. The HDD 104 is a hard disk drive, and stores an operating system, system software, application software, image data, and the like. The program deployed on the RAM 102 is executed under the control of the CPU 101 to process image data or another data stored in the RAM 102, ROM 103, or HDD 104. A compact image forming apparatus includes no HDD 104, and stores various software programs and application software programs in the ROM 103. Alternatively, instead of the HDD 104, a storage device other than a hard disk, for example, a flash memory such as an SSD (Solid State Disk) may be used.

The console unit I/F 105 connects between the controller unit 100 and a console unit 106. The console unit 106 includes a display unit such as a touch panel for notifying a user of the state of the image forming apparatus, and accepting an operation from the user, and operation buttons for giving an instruction to the image forming apparatus. The device I/F 107 connects between the controller unit 100 and a scanner 108 or a printer 109 to receive/output image data. Image data input from the scanner 108 via the device I/F 107 is stored in the RAM 102 or HDD 104. The stored image data undergoes image processing by an application program stored in the RAM 102, as needed. To print image data, the image data is output to the printer 109 via the device I/F 107. The network I/F 110 is connected to the LAN to receive/output image data or information for controlling the image forming apparatus from/to an external device on the network.

In addition, for example, if the image forming apparatus has a FAX function, the controller unit 100 may include a modem I/F (not shown) to connect to a public line, thereby enabling FAX transmission. Alternatively, for example, to enable to read out data stored in a flash memory card or the like and print the readout data, the controller unit 100 may include a USB I/F (not shown).

Figure 2:
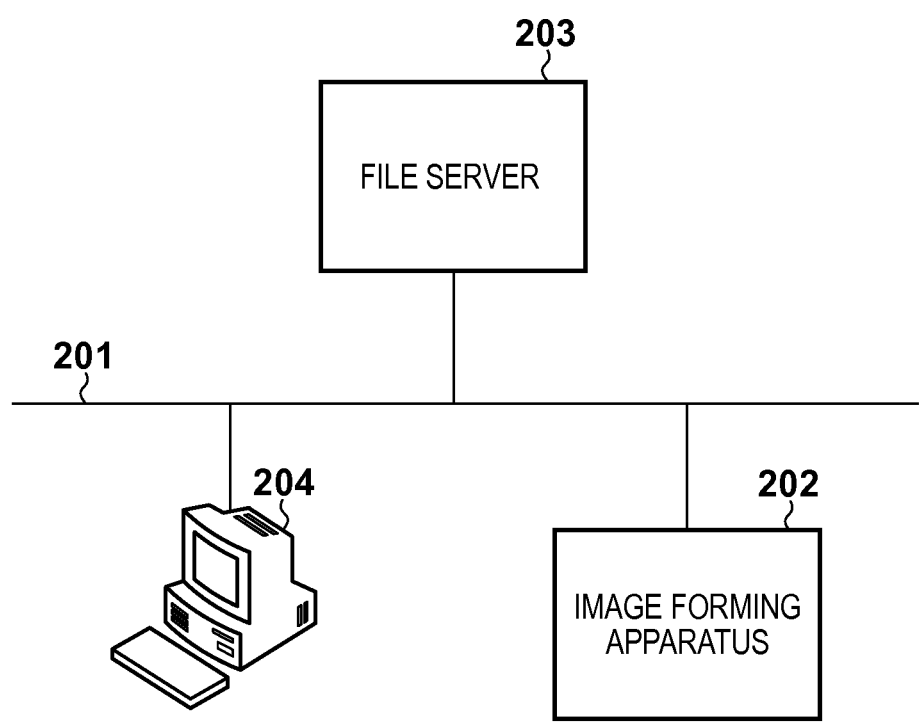
FIG. 2 depicts a view showing an example of a system arrangement according to the embodiment.

FIG. 2 depicts a view showing an example of a system arrangement according to the embodiment.

An image forming apparatus 202 and a file server 203 according to the embodiment are connected to a LAN 201. A device connected to the LAN 201 performs a file operation to the file server 203 using a file sharing protocol such as SMB, CIFS, or WebDAV. SMB is an abbreviation for Server Message Block; CIFS, Common Internet File System; and WebDAV, Web-based Distributed Authoring and Versioning.

The image forming apparatus 202 can also execute a file operation to the file server 203 connected to the LAN 201 using a file sharing protocol such as SMB, CIFS, or WebDAV. Note that the file sharing protocol for file access is a well-known technique, and a detailed description thereof will be omitted.

The image forming apparatus 202 can communicate with the file server 203 using the file sharing protocol, thereby obtaining contents of a file and attribute information of a file or directory stored in the file server 203. The attribute information of a file or directory is information about the file or directory such as the name, creation date/time, update date/time, access date/time, file size, and access right. Note that the attribute information of a file or directory is not limited to the above-described one, and may include other information or may not include some of the above information. In a client PC 204, application software runs, and a printer driver or the like sends a print instruction from the application software to the image forming apparatus 202 via the LAN 201. Note that one image forming apparatus 202, one file server 203, and one client PC 204 exist in FIG. 2. However, the number of image forming apparatuses, file servers, or client PCs is not limited to one, and a plurality of image forming apparatuses, file servers, or client PCs may exist.

User authentication in the image forming apparatus 202 will be described.

The image forming apparatus 202 restricts the use so that only a specific user can use it, and permits a user operation after performing user authentication. For example, information (a user name and password) about user authentication is held as a user database in the HDD 104 of the image forming apparatus 202. Before using the image forming apparatus 202, the apparatus 202 displays an authentication screen on the console unit 106 to prompt the user to input user information such as a user name and password. Only when the user information coincides with that in the user database, the user is permitted to use the image forming apparatus 202. Alternatively, the image forming apparatus 202 may belong to the domain of an authentication system such as Microsoft Active Directory. In this case, the image forming apparatus 202 includes no user database and inquires, of an authentication server on the network, whether user information input by the user is authentic.

If the image forming apparatus 202 uses user authentication, a group to which the user belongs may be defined, and it may be determined based on a right held by the group whether the user can use the apparatus. In this case, the user may belong to a plurality of groups, and respective groups need not be completely separate and may have a nested structure. More specifically, assume that user A belongs to three groups G1, G2, and Gx, and group Gx includes groups G3 and G4. In this case, to permit user A to use the image forming apparatus 202, user A is given a use right or at least one of groups G1, G2, G3, G4, and Gx needs to be given a use right. User authentication in the image forming apparatus 202 is performed using a well-known technique and is irrelevant to the present invention, and a description thereof will be omitted. In the embodiment, user authentication is performed. However, all users may use the image forming apparatus 202 without user authentication. Furthermore, the external file server 203 may perform authentication in consideration of groups to which the user belongs, similarly to the above-described user authentication in the image forming apparatus 202.

Figure 3:
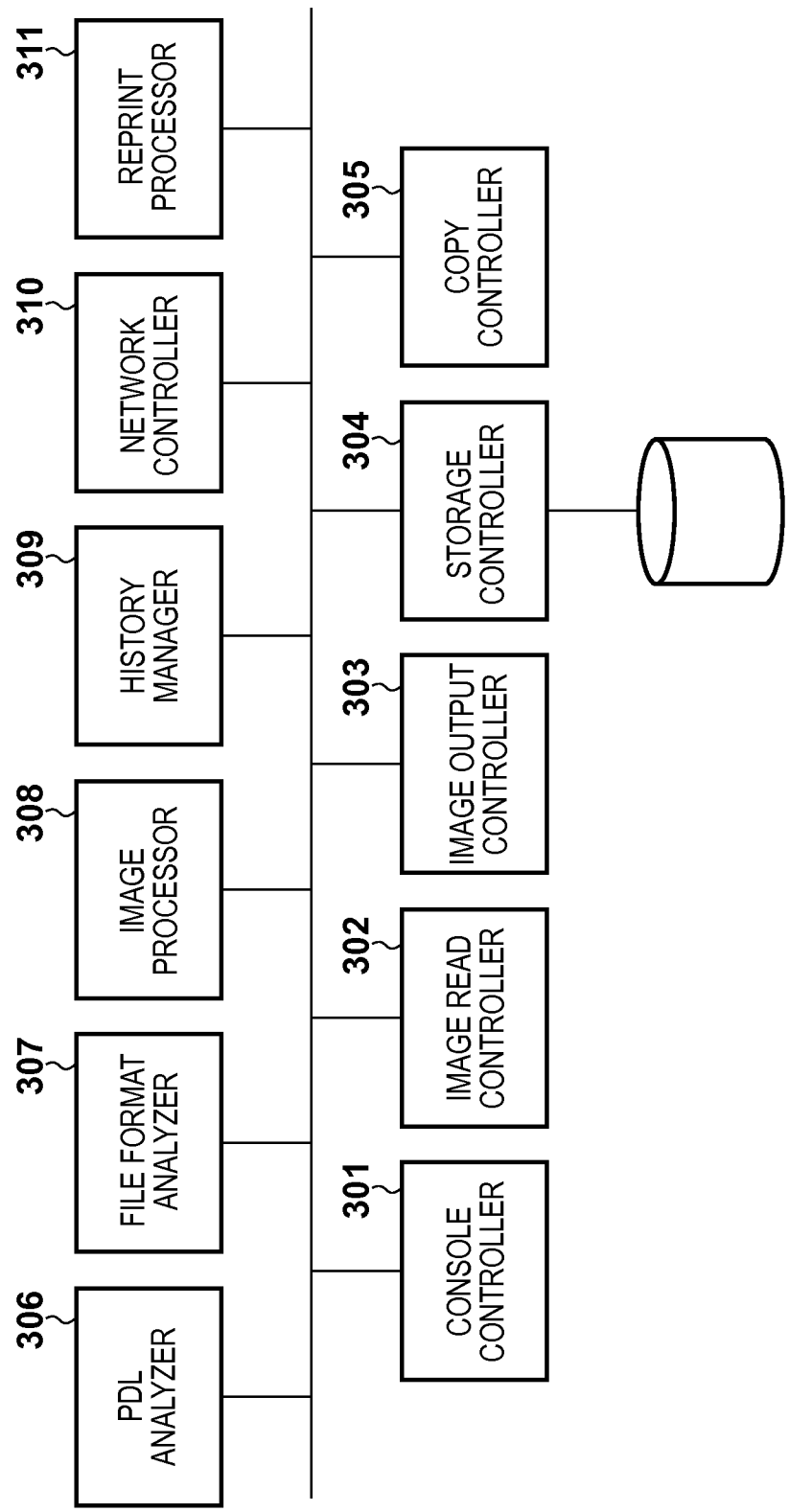
FIG. 3 is a functional block diagram for explaining the function of the image forming apparatus according to the embodiment.

FIG. 3 is a functional block diagram for explaining the function of the image forming apparatus 202 according to the embodiment. Note that the function of each processor shown in FIG. 3 is implemented when the CPU 101 executes a program. The program is stored in the ROM 103 or HDD 104. FIG. 3 shows only components necessary to the description of the embodiment. Other components for implementing the function of the image forming apparatus 202 such as FAX processing may exist, as a matter of course.

Copy print processing will first be explained. Although not shown, the scanner 108 includes a pressing plate and sheet document reader (ADF). When the user sets an original on a platen or ADF and presses an original read start button (not shown) on the console unit 106, the scanner 108 optically reads the original set on the platen or ADF. When reading an original of a plurality of pages, the original sheets are replaced on the platen by the user and read, or the original sheets set on the ADF are sequentially conveyed and read. At this time, the user can use the console unit 106 to make print settings regarding output such as imposition on the sheet, finisher setting such as stapling, and image quality setting such as density.

A console controller 301 displays a screen and information necessary for an operation on the console unit 106, receives information about an operation on the console unit 106 by the user, and determines the instructed operation. When the user requests copy printing, the console controller 301 generates a screen necessary for copying, and instructs the console unit 106 to display it. Since the console unit 106 displays the screen for copying, the user sets an original on the platen or ADF, and instructs copying. At the same time, the user may instruct the above-described print settings. The input copy instruction is transferred from the console unit 106 to the console controller 301. Upon receiving the copy instruction, the console controller 301 shifts control to a copy controller 305. To read an original, the copy controller 305 instructs an image read controller 302 to read the original. The image read controller 302 controls the scanner 108 via the device I/F 107 to read the original. When replacing original sheets on the platen, the copy controller 305 returns control to the console controller 301. The console controller 301 then displays again, on the console unit 106, a selection screen for prompting the user to select reading of the next original sheet or the start of printing. A storage controller 304 stores the data read by the scanner 108 in the RAM 102 or HDD 104 via the device I/F 107 and system bus 111. According to a factor such as the data size or whether quick processing is required, the image read controller 302 determines which of the RAM 102 and HDD 104 stores the data.

To print the read image data, the copy controller 305 instructs an image output controller 303 to print the read image data stored in the storage controller 304. The image output controller 303 instructs an image processor 308 to perform image processing for the image data stored in the RAM 102 or HDD 104 under the control of the storage controller 304 according to the print settings designated by the user. The image processing includes editing of image data to be printed such as imposition of two original sheets on one sheet (2in1). Upon completion of image editing for printing, the image processor 308 instructs the storage controller 304 to store the edited image data. The image output controller 303 reads out the image data having undergone the image processing from the RAM 102 or HDD 104 using the storage controller 304, and outputs it to the printer 109 via the system bus 111 and device I/F 107. The printer 109 sequentially prints images on sheets based on the transmitted image data. The printed image data is set with "copy print" as a job type, and stored in a history manager 309. At this time, the history manager 309 also stores the printing date/time, the name of a user who performed printing, print settings, and image data read by the scanner 108. The image data stored at this time is image data before processing by the image processor 308. Since the history manager 309 also stores the print settings upon printing, and can restore the print settings upon copy printing, the image data read from the original is thus saved.

A case in which based on page description language (PDL) data transmitted to the image forming apparatus 202, printing is performed using a printer driver from application software of a device such as an external PC connected to the network (LAN) 201 will be explained. In this case, the image forming apparatus 202 performs printing by interpreting the PDL data. Note that the CPU 101 may interpret the PDL data using a program stored in the ROM 103 or HDD 104 or hardware for a dedicated PDL interpreter may interrupt the PDL data. The printer driver and PDL data interpretation are irrelevant to the present invention, and a detailed description thereof will be omitted.

The client PC 204 transmits, to the image forming apparatus 202 via the LAN 201, PDL data generated by the printer driver or the like of the client PC 204, and print settings for the PDL data. In the embodiment, the PDL data and the print settings are transmitted separately. The print settings, however, may be contained in the PDL data and extracted by a PDL analyzer 306 (to be described later). In the image forming apparatus 202, a network controller 310 receives the PDL data via the network I/F 110 connected to the LAN 201. The received PDL data is stored in the RAM 102 or HDD 104 via the system bus 111 under the control of the storage controller 304. After storing the PDL data, control shifts to the PDL analyzer 306. The PDL analyzer 306 analyzes the stored PDL data, and converts it into data of a format printable by the image forming apparatus 202. The storage controller 304 stores the converted data in the RAM 102 or HDD 104. To print the received PDL data, the PDL analyzer 306 instructs the image output controller 303 to print the stored image data which has been converted into the printable format. The image output controller 303 instructs the image processor 308 to perform image processing for the data stored under the control of the storage controller 304 in accordance with the print settings transferred from the client PC 204 together with the PDL data. The image processing in this case is the same as that described in copy printing.

After the image processor 308 completes the image processing for printing, and stores the obtained data in the RAM 102 or HDD 104, the image output controller 303 reads out the image data having undergone the image processing from the RAM 102 or HDD 104 using the storage controller 304. The readout image data is transmitted to the printer 109 via the system bus 111 and the device I/F 107. The printer 109 sequentially prints images on sheets based on the transmitted data. The printed image data is set with "PDL print" as a job type, and stored in the history manager 309. At this time, the history manager 309 stores the printing date/time when PDL printing was performed, the name of a user who performed printing, and print settings upon printing which have been transmitted together with device information of the transmission source and the PDL data. The history manager 309 also stores image data which has been converted into a format printable by the image forming apparatus 202 and stored by the storage controller 304. The image data stored at this time is image data before processing by the image processor 308, similarly to the aforementioned copy processing. This is because the print settings which have been transmitted together with the PDL data are stored, and thus the image data in PDL printing can be restored.

A case (file direct print) in which image data of a format such as TIFF or JPEG or document data of a format such as Adobe PDF is directly transmitted from the client PC 204 to the image forming apparatus 202 to print by the image forming apparatus 202 will be explained. Note that the above-described image data or document data will be simply referred to as image data hereinafter.

In this case, the CPU 101 may interpret image data using a program stored in the ROM 103 or HDD 104, or dedicated hardware may interpret image data. The client PC 204 transmits, to the image forming apparatus 202 via the LAN 201, image data interpretable by the image forming apparatus 202, and print settings. For example, the client PC 204 accesses the Web server of the image forming apparatus 202 using the Web browser, and transmits the image data and print settings from the client PC 204 to the image forming apparatus 202. In the image forming apparatus 202, the network controller 310 receives the image data and print settings via the network I/F 110. The network controller 310 requests the storage controller 304 to store the received image data and print settings. The image data and print settings are stored in the RAM 102 or HDD 104 via the system bus 111. After storing the image data and print settings, control shifts to a file format analyzer 307. The file format analyzer 307 interprets the stored image data, and converts it into data of a format printable by the image forming apparatus 202. The converted data is stored in the RAM 102 or HDD 104 under the control of the storage controller 304. To print the received image data, the file format analyzer 307 instructs the image output controller 303 to print the image data converted into the printable format. The image output controller 303 instructs the image processor 308 to perform image processing for the image data stored by the storage controller 304 in accordance with the print settings transferred from the client PC 204. The image processing is as described above in copy printing or the like. After the image processor 308 completes the image processing for printing, the image output controller 303 reads out the image data having undergone the image processing by the storage controller 304, and transmits it to the printer 109 via the system bus 111 and device I/F 107. The printer 109 sequentially prints images on sheets based on the image data. The printed image data is set with "file direct print" as a job type, and stored in the history manager 309. The history manager 309 also stores the printing date/time when file direct printing was performed, the name of a user who performed printing, and print settings which have been transmitted together with device information of the transmission source and the image data. Furthermore, the history manager 309 stores image data which has been converted into a format printable by the image forming apparatus 202 and stored by the storage controller 304. The image data stored at this time is image data before processing according to the print settings by the image processor 308. This is because the print settings which have been transmitted together with the data are stored, and thus the image data based on the print settings upon file direct printing can be restored.

A case (pull print) in which the image forming apparatus 202 obtains and prints image data in the file server 203 connected to the network 201 will be described.

Image data is data of a format such as TIFF, JPEG, or PDF. Similarly to the file direct printing described above, the image forming apparatus 202 interprets and prints image data of a format such as TIFF, JPEG, or PDF. Assume that the file server 203 adopts a protocol for sharing a file on a network, such as SMB, CIFS, or WebDAV. Note that the CPU 101 may interpret image data using a program stored in the ROM 103 or HDD 104, or dedicated hardware may interrupt image data. The file sharing protocol used between the file server 203 and the image forming apparatus 202 may be a protocol other than SMB, CIFS, or WebDAV. Note that interpretation of image data, and the file sharing protocol are well known and are irrelevant to the present invention, and a detailed description thereof will be omitted.

The user designates, through the console unit 106, the connection protocol such as CIFS or WebDAV, IP address, host name, and path of the file server 203 as a connection destination, thereby connecting to the file server 203. If the file server 203 requires authentication to access the file server 203, the console unit 106 displays an authentication screen for the file server 203, to which the user inputs information (a user name, a password, and the like) necessary for authentication. The image forming apparatus 202 then inquires authentication of the file server 203. The input user information is stored as history information for reprinting (to be described later). Alternatively, if user authentication has been performed for the image forming apparatus 202, the image forming apparatus 202 may try to access the file server 203 using the user information used for user authentication. If the image forming apparatus 202 belongs to the domain of the authentication system, it may use a technique such as Kerberos to access the file server 203 without authentication again. As another example, if authentication is executed using the user database of the image forming apparatus 202, user information in the image forming apparatus 202 and user information in the file server 203 are stored in advance in association with each other. In this case, when the image forming apparatus 202 accesses the file server 203, user information in the file server 203 associated with authenticated user information can be obtained. This makes it possible to access the file server 203 using the user information without any authentication operation via the console unit 106 by the user. The above-described methods are merely examples, and authentication for the file server 203 may be achieved by another method.

By using the console unit 106, the user selects a data file stored in the file server 203 and issues a print instruction. This data file is image data interpretable by the image forming apparatus 202. When issuing a print instruction for the data file, the user can designate, through the console unit 106, print settings regarding printing such as imposition. The image data, for which the user has issued the print instruction, is transmitted from the file server 203 to the image forming apparatus 202 via the LAN 201. In the image forming apparatus 202, the network controller 310 receives the image data via the network I/F 110. At the same time, the image forming apparatus 202 obtains attribute information (an update date/time, a file size, an owner, and the like) of the image data from the file server 203. The network controller 310 requests the storage controller 304 to store the received image data and its attribute information, thereby storing them in the RAM 102 or HDD 104 via the system bus 111.

After storing the image data, control shifts to the file format analyzer 307. The file format analyzer 307 interprets the stored image data, and converts it into data of a format printable by the image forming apparatus 202. The storage controller 304 stores the converted image data in the RAM 102 or HDD 104. To print the received image data, the file format analyzer 307 instructs the image output controller 303 to print the image data which has been converted into the format printable by the image forming apparatus 202 and stored by the storage controller 304. The image output controller 303 instructs the image processor 308 to perform image processing for the stored image data according to the print settings instructed by the user. The image processing is as described above in copy printing. After the image processor 308 completes the image processing for printing, the image output controller 303 reads out the image data having undergone the image processing under the control of the storage controller 304, and outputs it to the printer 109 via the system bus 111 and device I/F 107. The printer 109 sequentially prints images on sheets based on the image data. The printed image data is set with "network print" as a job type, and stored in the history manager 309. The history manager 309 also stores the date/time when printing (network print) was performed, the name of a user who performed the printing, the URI of the data obtaining source, the update date/time, the attribute information such as the file size, and the print settings upon printing. The image data stored at this time is image data before processing by the image processor 308. However, the image data which has been converted into the format printable by the image forming apparatus 202 and stored by the storage controller 304 may be saved together with the path (URL) of the file server 203.

Figure 8:
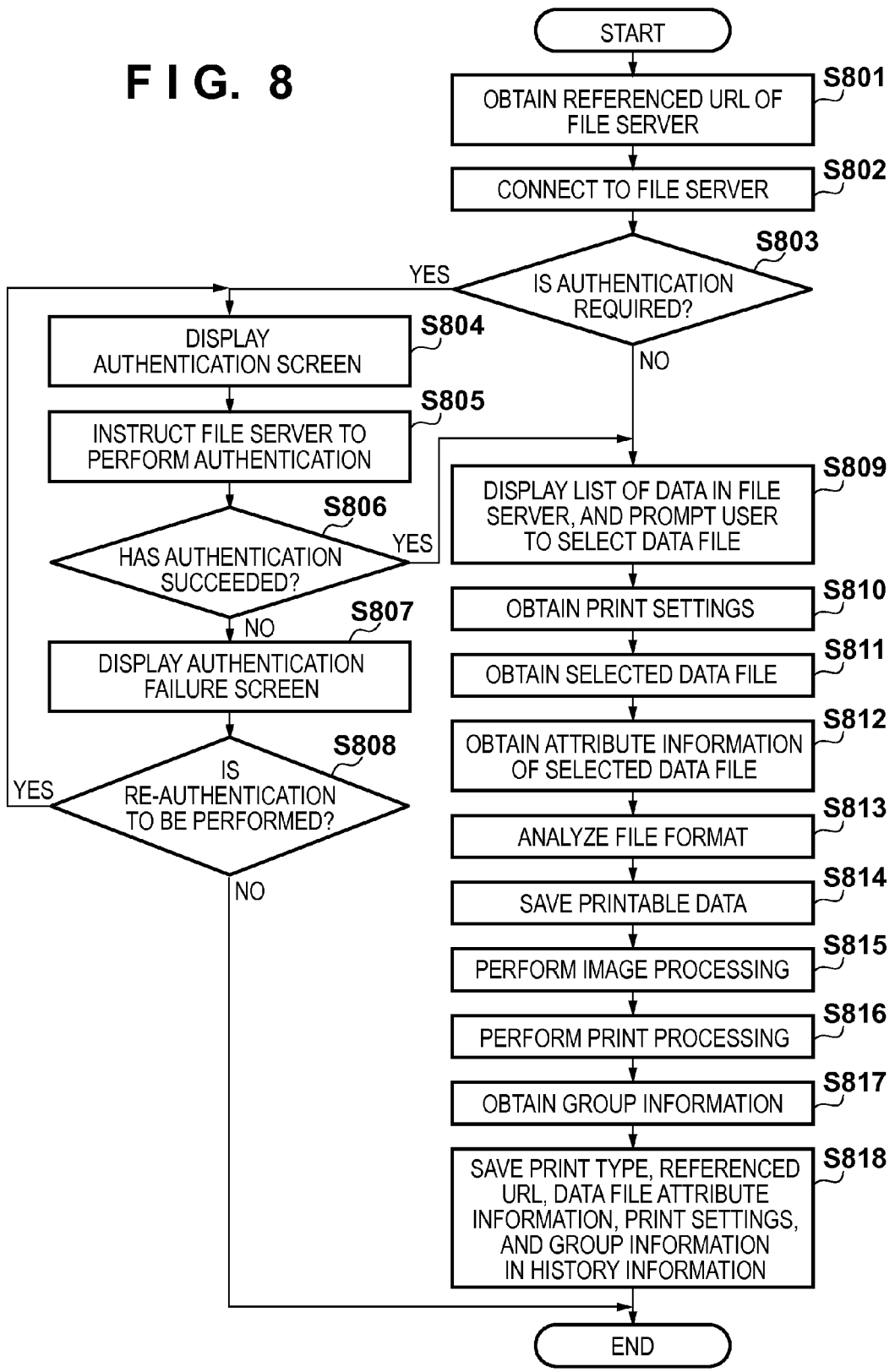
FIG. 8 is a flowchart for describing processing which is executed by the image forming apparatus according to the first embodiment to obtain and print image data from a file server connected to a network, and save history information.

FIG. 8 is a flowchart for describing processing of obtaining image data from the file server 203 connected to the network, printing the image data, and saving history information by the image forming apparatus 202 according to the first embodiment. A program which executes this processing is stored in the ROM 103 or HDD 104, deployed on the RAM 102 in execution, and executed under the control of the CPU 101. This processing starts when the user designates the connection protocol such as CIFS or WebDAV, IP address, host name, and path (URL) of the file server 203 using the console unit 106, and instructs to print a data file in the file server 203.

In step S801, the CPU 101 obtains the URL of the file server 203 which has been designated by the user using the console unit 106. In step S802, the CPU 101 connects to the file server 203 indicated by the URL received in step S801. In step S803, the CPU 101 determines whether the file server 203 connected in step S802 requires authentication. If it is determined in step S803 that authentication is required, the process advances to step S804; otherwise, the process advances to step S809. In step S804, the CPU 101 displays an authentication screen (not shown) on the console unit 106. The user then inputs information necessary for authentication, such as a user name and password, to the authentication screen displayed in step S804, and instructs to execute authentication processing. The process advances to step S805, and the CPU 101 receives the user information input by the user via the authentication screen displayed on the console unit 106, and instructs the file server 203 to perform authentication using the received user information. In step S806, the CPU 101 receives an authentication result from the file server 203, and determines whether user authentication has succeeded. If it is determined in step S806 that authentication has succeeded, the process advances to step S809; otherwise, the process advances to step S807. In step S807, the CPU 101 displays an authentication failure screen (not shown) on the console unit 106. In step S808, the CPU 101 determines whether the user has instructed re-authentication. For example, a button to instruct re-authentication is arranged on the authentication failure screen displayed in step S807, thereby confirming whether the user requests re-authentication. Alternatively, a criterion is established so as to forcibly inhibit re-authentication when authentication has failed a given number of times. The above-described criterion for re-authentication is merely an example, and the present invention is not limited to this. If it is determined in step S808 that re-authentication is to be performed, the CPU 101 returns the process to step S804, and displays the authentication screen again. On the other hand, if it is determined in step S808 that no re-authentication is to be performed, the CPU 101 cannot access the file server 203, thereby terminating the process.

If it is determined in step S806 that authentication has succeeded, or it is determined in step S803 that authentication is not required, the process advances to step S809, and the CPU 101 displays, on the console unit 106, a list of data files in the file server 203, and prompts the user to select a data file to be printed. Although not described in the embodiment for the sake of simplicity, it is possible to execute directory search processing of changing the directory in the file server 203 and tracing the directory in which a desired data file exists in step S809. The process advances to step S810, and the CPU 101 displays a print setting screen on the console unit 106, from which print settings set by the user are obtained. In step S811, the CPU 101 obtains contents of the data file selected by the user in step S809. The process advances to step S812, and the CPU 101 obtains attribute information of the data file selected by the user in step S809. In step S813, the CPU 101 analyzes the contents of the data file obtained in step S811, and converts the data file into image data of a format printable by the image forming apparatus 202. The process advances to step S814, and the CPU 101 saves, in the HDD 104, the image data of the printable format which has been converted in step S813. Note that the image data converted in step S813 is saved in the HDD 104 in this embodiment. The data before conversion (that is, the data file obtained in step S811), however, may be saved. The process advances to step S815, and the CPU 101 performs image processing for the image data of the format printable by the image forming apparatus 202, which has been saved in step S814, in accordance with the print settings obtained in step S810. The process advances to step S816, and the CPU 101 causes the printer 109 to perform printing based on the data having undergone the image processing in step S815.

The process advances to step S817. If it has been determined in step S803 that authentication is required, the CPU 101 obtains information about a group to which the user belongs, based on the authentication information input by the user in step S804. To obtain the group information of the user, the CPU 101 may inquire about the information of the file server or a directory service such as Microsoft Active Directory. This method is merely an example, and group information may be obtained by another method, as a matter of course. Note that if it has been determined in step S803 that authentication is not required, group information is null.

The process advances to step S818, and the CPU 101 saves history information. The history information is information regarding a job printed in step S816, such as the job type, the printing date/time, and the user ID of the user. Furthermore, the CPU 101 saves the referenced URL of the data file selected in step S809, the print settings obtained in step S810, the attribute information of the data file obtained in step S812, and the image data of the printable format converted in step S813, the group information obtained in step S817, and the like. Note that the attribute information of the data file is information regarding a file such as a file name, creation date/time, update date/time, access date/time, file size, and access right. The history information will be described later with reference to FIGS. 4A and 4B.

A case in which a data file in the file server 203 is printed has been explained with reference to the flowchart. This processing is also applicable to copy printing and PDL printing described above. In copy printing, for example, the processing in steps S801 to S809 corresponds to processing of inputting image data from the scanner 108 using the pressing plate or ADF. In this case, it is not necessary to load image data and its attribute information from another device via a network, thereby eliminating the need for the processing in steps S811, S812, and S813. The information saved as history information in step S818 includes the image data read by the scanner 108 and the print settings set by the user.

In a case of printing PDL data, PDL data is received from a PC or the like via a network in steps S801 to S809. In this case, it is not necessary to load image data and its attribute information from the file server 203, thereby eliminating the need for the processing in steps S811 and S812. In step S813, the PDL data is analyzed. The information saved as history information in step S818 includes image data of a format printable by the image forming apparatus 202 which has been generated by analyzing the PDL data, and the print settings set by the user. Furthermore, for the file direct printing, similarly to PDL printing, a file format is analyzed in step S813.

FIGS. 4A and 4B depict views illustrating examples of a history management table stored in the history manager 309 according to the first embodiment. FIG. 4A shows a view illustrating an example of a table of history information managed commonly to respective jobs in the image forming apparatus 202. FIG. 4B shows a view illustrating an example of a table of history information added in a print job of printing a data file in the file server 203.

The history management table in FIG. 4A has the items of a job type 401, date/time 402, user ID (user identification information) 403, print settings save destination 404, printing image data save destination 405, and external file attribute ID 406. Note that the history management table described in the first embodiment is merely an example, and may include items other than those in FIGS. 4A and 4B (to be described later). The job type 401 records the type of job. For example, "COPY" is recorded for copy printing, "PDL" is recorded for PDL printing, "FILE" is recorded for file direct printing, and "NET" is recorded for printing of a file on a network. Although the first embodiment describes only these job types, the history manager 309 may record another job type processible by the image forming apparatus 202. For example, when a document received by FAX is printed, "FAX" may be stored in the job type 401. In addition, when scanned image data is sent by mail using a file transmission function, "SEND" may be stored in the job type 401. For the aforementioned file direct printing, "DIRECT" may be stored.

The date/time 402 stores the date/time when a job of a corresponding job type was executed. The user ID 403 stores the user ID of a user who executed a job of the job type. As the user ID, the user name is stored in the first embodiment. However, unique information such as a management ID for specifying the user may be stored. The print settings save destination 404 indicates the save destination of a file which saves print settings upon printing. The printing image data save destination 405 stores a storage destination such as the HDD 104 of the image forming apparatus 202. In FIG. 4A, only file names are described in the print settings save destination 404 and printing image data save destination 405. However, a full path or a path relative to a predetermined path may be stored. In the first embodiment, for example, only file names are described by assuming that the printing image data save destination is fixedly set to "/history/printdata" and the print settings save destination is fixedly set to "/history/printsetting". The external file attribute ID 406 stores an ID for looking up an additional table which records various attributes of a designated file when printing image data saved in a device such as a file server connected to a network. In FIG. 4A, the external file attribute ID 406 is blank ("−") except for "NET" because the file server 203 is not accessed. The job attribute "NET" represents printing of a data file in the file server 203, so the external file attribute ID 406 is stored. In FIG. 4A, "28" is stored in the external file attribute ID, and corresponds to "28" in an ID 407 in the table shown in FIG. 4B. That is, file attributes of the file server for the job type "NET" in FIG. 4A correspond to pieces of information in respective fields of the ID "28" in FIG. 4B.

The table in FIG. 4B includes the items of the ID 407, a referenced URL 408, a protocol 409, an update date/time 410, a file size 411, user information 412, and a group 413. As described above, the ID 407 is a field referred to using the external file attribute ID 406 in FIG. 4A. The referenced URL 408 stores the URL of image data in the file server 203 that was designated for printing. The protocol 409 stores a protocol used to access the file server 203. The update date/time 410 and file size 411 store the update date/time and file size of image data in the file server that was designated for printing, respectively. The user information 412 stores information about a user who accessed the file server 203. Although a user name is stored as the user information 412 in the first embodiment, for example, user information such as password information necessary for access to the file server may be stored together with the user name. The group 413 stores information of all groups to which the user belongs upon executing printing in response to a user instruction.

In the first embodiment, two history management tables are separated as shown in FIGS. 4A and 4B. However, these two management tables may be integrated and managed as one history management table.

A method of reprinting image data designated based on history information will be explained. Although reprinting will be exemplified in the embodiment to be described below, the present invention is not limited to this, and is applicable to, for example, re-execution of transmission processing and the like.

FIGS. 5A and 5B depict views illustrating examples of a history management table stored in the history manager 309 according to the first embodiment.

As described above, the history manager 309 receives history information to be recorded from a processing module such as copy print module or PDL print module, and stores it in a history management table managed by itself. Note that only history information regarding printing has been described for the sake of simplicity in the first embodiment. However, history information about another operation (for example, FAX or image mail transmission) to the image forming apparatus may be stored and managed. Upon accepting a history information list obtaining request from another processor, the history manager 309 returns all pieces of history information managed by itself as a history information list. It is also possible to designate a condition to each item of the history management table, extract only necessary history information, and returns a history information list to another processor.

Assume, for example, that the history information is as shown in FIGS. 5A and 5B. In this case, when the history manager 309 is instructed to return only history information with the job type "COPY", it transmits only pieces of history information 501 and 505 in FIG. 5A as a history information list to the request source. Alternatively, when only history information with the user ID "suzuki" is requested, the history manager 309 returns only history information 502 in FIG. 5A as a history information list. Not only one but also a plurality of conditions may be designated. For example, as for the job type, it is possible to request the history manager 309 to return history information with the job type "PDL" or "NET". In this case, only the pieces of history information 502, 503, 504, and 506 in FIG. 5A are transmitted to the request source. Alternatively, a range may be designated for a date/time, thereby designating history information. In the example shown in FIGS. 5A and 5B, if history information with the printing date/time "from 2011.1.5 to 2011.1.31" is requested of the history manager 309, the pieces of history information 503 and 504 in FIG. 5A are transmitted as a history information list to the request source.

Furthermore, the OR or AND of a plurality of items may be set as a condition to request history information of the history manager 309. The AND condition for a plurality of items will be exemplified. When history information with the job type "COPY" or "NET" and the user ID "yamada" is requested of the history manager 309, the history manager 309 transmits the pieces of history information 501, 503, and 505 in FIG. 5A as a history information list to the request source. In addition to the above conditions, a range may be designated for a date/time. Assume that history information with the job type "COPY" or "NET", the user ID "yamada", and the printing date/time "from 2011.1.5 to 2011.2.1" is requested of the history manager 309. In this case, the pieces of history information 503 and 505 in FIG. 5A are transmitted as a history information list to the request source. That is, the history manager 309 returns only necessary history information as a history information list to the request source according to a history information filtering condition from each processor.

A reprint processor 311 controls reprint processing. When the user instructs the start of reprint processing by operating the console unit 106, the reprint processor 311 is requested to display history information to undergo reprinting. First, the reprint processor 311 requests a history information list of the history manager 309. At this time, the history manager 309 is instructed to obtain only history information of the user ID of a user who currently operates the image forming apparatus 202. This is because, if reprinting is possible based on history information of an operation by another user, another user can print a document which can be printed by only a specific user (user ID) stored in the history information. A reprinting target is restricted to only history information of the user ID of the user. This is merely an example, and this restriction is not necessary if the image forming apparatus 202 can be used in an environment where printing is permitted for all users. Assume, for example, that the user currently operates the image forming apparatus 202 using the user ID "yamada". As described above, the reprint processor 311 requests only history information of a specific user ID, and thus the history manager 309 extracts only history information of the designated user ID from the history management table, and returns them as a history information list to the reprint processor 311. In the example of FIGS. 5A and 5B, the history manager 309 returns the pieces of history information 501, 503, and 505 with the user ID "yamada" to the reprint processor 311.

Although not described in the first embodiment, in a case that the history information stores a job type other than that regarding printing, the reprint processor 311 may request a history information list of the history manager 309 by adding only a job type regarding printing as a condition. The reprint processor 311 shapes, for screen display, the history information list received from the history manager 309, and instructs the console unit 106 to display history information. At this time, history information selected on the console unit 106 and history information described in the history information list are associated with each other.

Figure 6:
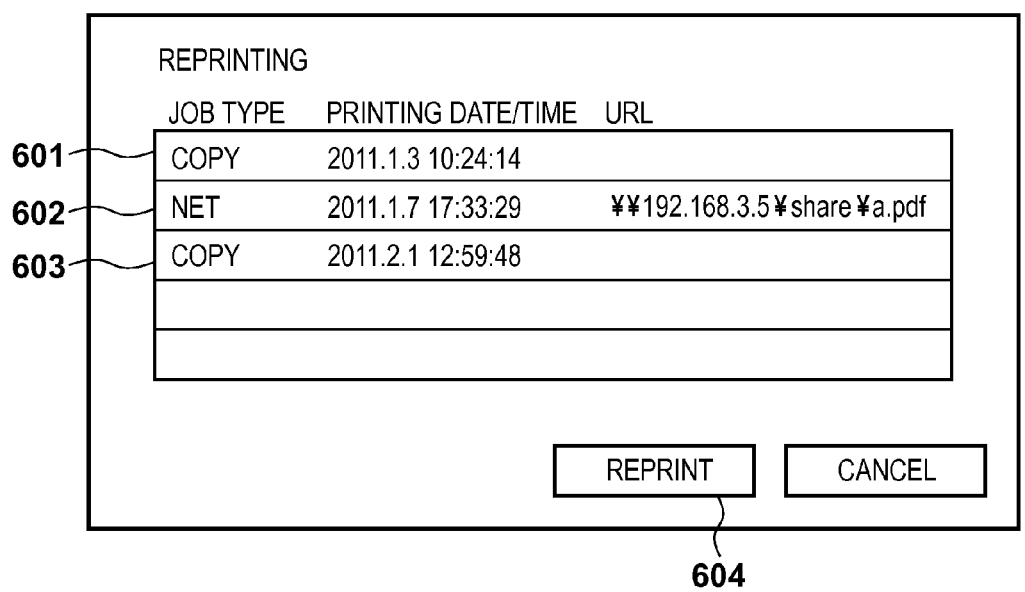
FIG. 6 depicts a view showing an example of a history information selection screen in reprinting according to the first embodiment.

FIG. 6 depicts a view showing an example of a history information selection screen in reprinting according to the first embodiment.

As represented by pieces of history information 601, 602, and 603, information including the job type, printing date/time, and referenced URL (for only the history information 602) is displayed as history information. The user selects history information to undergo reprinting from the screen, and presses a reprint button 604. Note that although the screen shown in FIG. 6 includes a cancel button to stop reprinting, and a page feed button used when a plurality of pieces of history information exist and do not fit in one screen, this is irrelevant to the present invention and a detailed description thereof will be omitted.

The console unit 106 transfers information about the history information selected by the user to the reprint processor 311. Based on the information obtained from the console unit 106, the reprint processor 311 specifies the history information selected by the user from the history information list obtained from the history manager 309. Details thereof will be described later with reference to a flowchart shown in FIG. 9. If the job type is "NET", it is determines whether re-authentication is necessary, by comparing a group to which the user belonged in initial printing with a group to which the user currently belongs. If the groups are different from each other and thus re-authentication is necessary, authentication processing is executed via the network controller 310. Furthermore, it is confirmed whether the selected history information stores the print settings save destination 404. If no print settings save destination is stored, a print setting screen (not shown) is displayed. The user can make settings about printing including imposition upon printing, finisher setting such as stapling, and density setting through the print setting screen, but this is irrelevant to the present invention and a description thereof will be omitted.

After the user makes print settings and instructs reprinting, the reprint processor 311 specifies a printing image data save destination based on the printing image data save destination 405 of the selected history information, and the storage controller 304 obtains the image data. The reprint processor 311 transfers the image data and the print settings set by the user to the image output controller 303, and instructs the image output controller 303 to print. The image output controller 303 instructs the image processor 308 to perform image processing for the image data which has been transferred from the reprint processor 311 and stored by the storage controller 304. Similar to copy printing described above, the image processor 308 executes, for the image data, the image processing for printing according to the print settings set by the user, and saves the image data having undergone the image processing. The image output controller 303 causes the storage controller 304 to read out the image data as the result of the image processing, and outputs it to the printer 109 via the system bus 111 and device I/F 107. The printer 109 sequentially prints images on sheets based on the image data.

Figure 7:
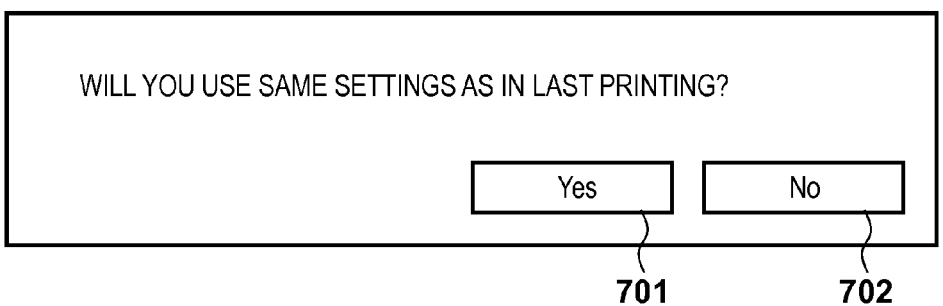
FIG. 7 depicts a view showing an example of a print settings confirmation screen according to the first embodiment.

FIG. 7 depicts a view showing an example of a print settings confirmation screen according to the first embodiment.

If the selected history information stores the print settings save destination 404, the console unit 106 displays a confirmation screen as shown in FIG. 7. That is, if print settings used in previous printing have been saved, it is inquired whether to perform reprinting with the same settings. If the user selects a "Yes" button 701 in FIG. 7, the reprint processor 311 causes the storage controller 304 to obtain printing image data and print settings from the printing image data save destination 405 and print settings save destination 404 of the history information. The reprint processor 311 then transfers the image data and print settings to the image output controller 303, and instructs the image output controller 303 to print. If the user selects a "No" button 702 in FIG. 7, the same processing as that when the selected history information does not store the print settings save destination 404 is performed. At this time, the print settings of the selected history information may be reflected and displayed on the print setting screen.

Figure 9:
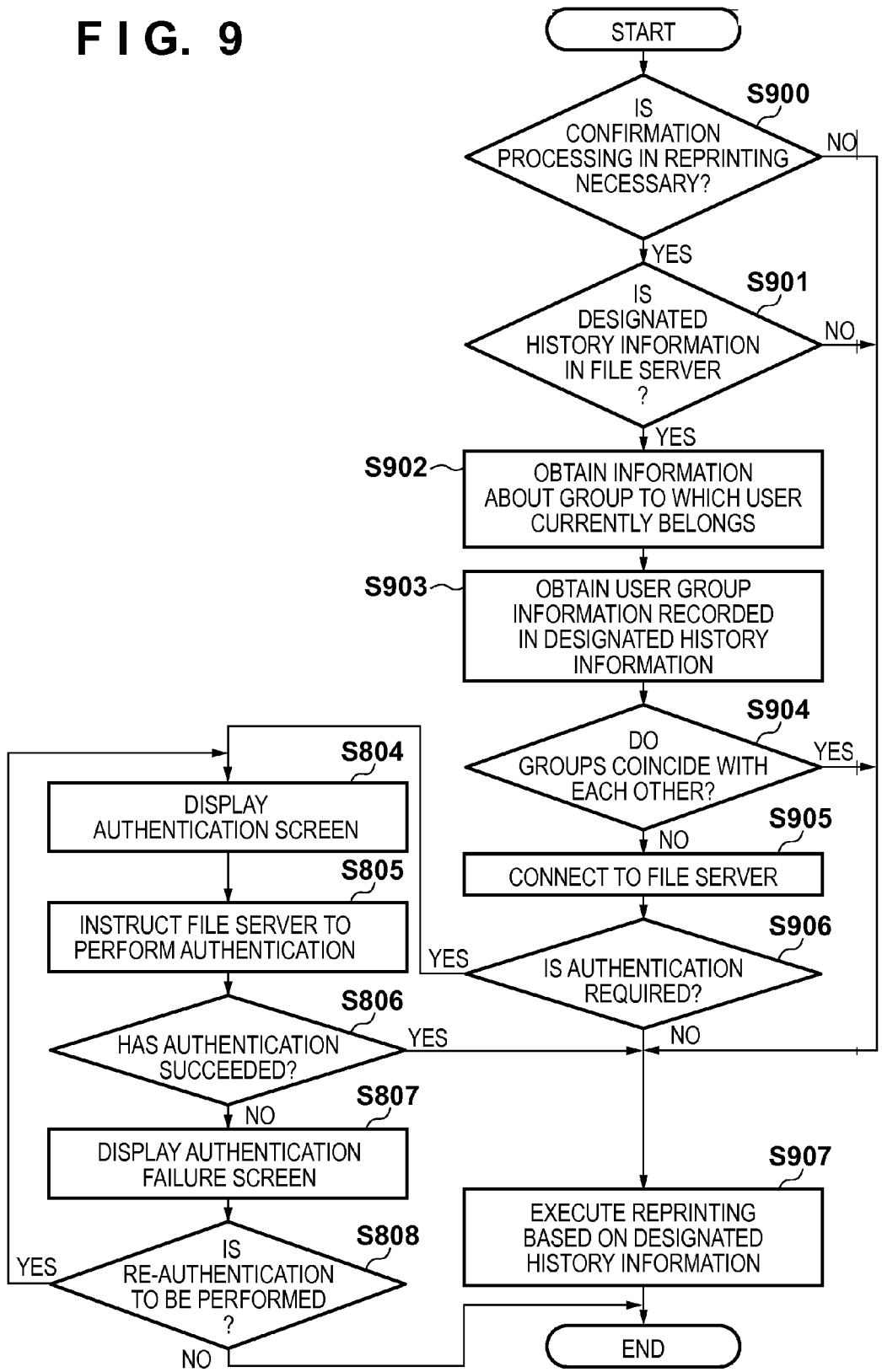
FIG. 9 is a flowchart for describing processing which is executed by the image forming apparatus according to the first embodiment when the user instructs reprinting based on history information.

FIG. 9 is a flowchart for describing processing which is executed by the image forming apparatus 202 according to the first embodiment when the user instructs reprinting based on history information. Note that a program which executes this processing is stored in the ROM 103 or HDD 104, deployed on the RAM 102 in execution, and executed under the control of the CPU 101. Processes for authentication in a file server in the flowchart shown in FIG. 9 are the same as those in the flowchart shown in FIG. 8 and have the same reference symbols, and a description thereof will be omitted.

In step S900, the CPU 101 determines whether reprinting should be performed after performing processing of confirming a group to which the user who instructed reprinting currently belongs. To do this, for example, a switch may be arranged. If the switch is valid (on), the group to which the user belongs may be confirmed. Alternatively, if the switch is invalid (off), reprinting may be executed without confirmation. If it is determined in step S900 that confirmation is necessary, the process advances to step S901, otherwise the process advances to step S907. In step S901, the CPU 101 causes the console controller 301 to obtain, from the history manager 309, history information based on which the user designated reprinting, and determines whether the history information is history information of printing of data in the file server 203. More specifically, if the job type of the designated history information is "NET", it is determined that the history information is history information of data in the file server 203. If it is determined in step S901 that the history information is history information of data in the file server 203, the process advances to step S902; otherwise, the process advances to step S907.

In step S902, the CPU 101 obtains user information stored in the history information from the history manager 309, and also obtains, via the network controller 310, information about a group to which the user currently belongs. More specifically, the CPU 101 uses the user information in the file server 203 to obtain information about a group to which the user currently belongs. To obtain the group information, the CPU 101 may inquire about the information of the file server 203 or a directory service such as Microsoft Active Directory. This method is merely an example, and group information may be obtained by another method, as a matter of course.

The process advances to step S903, and the CPU 101 obtains, from the history manager 309, information, stored in the history information, about a group to which the user belonged in initial printing. The process advances to step S904, and the CPU 101 compares the information, obtained in step S902, about the group to which the user currently belongs with the information, obtained in step S903, about the group to which the user belonged in initial printing, thereby determining whether the groups coincide with each other. At this time, in addition to determination of whether the groups coincide with each other, the nested structure of the groups is also determined, as described above. That is, it may be determined whether the user group information in initial printing obtained in step S903 includes the current user group information obtained in step S902. In this case, if the user group information in initial printing obtained in step S903 includes the current user group information obtained in step S902, it is determined that the groups coincide with each other. Although the CPU 101 determines in the flowchart whether the groups coincide with each other, the CPU 101 may confirm with an external file server or directory service via the network controller 310 whether the groups coincide with each other.

If it is determined in step S904 that the groups coincide with each other, it is determined that re-authentication is not necessary because the current user group is the same as or included in the group upon initial printing, and thus the process advances to step S907. On the other hand, if it is determined in step S904 that the groups do not coincide with each other, re-authentication is necessary, and thus the process advances to step S905. In step S905, the CPU 101 obtains a referenced URL stored in the history information from the history manager 309, and connects to the file server 203 indicated by the referenced URL via the network controller 310. The process advances to step S906, the CPU 101 determines whether authentication at the referenced URL is required. If it is determined in step S906 that authentication is required, re-authentication is necessary, and thus the process advances to step S804. On the other hand, if it is determined in step S906 that authentication is not required, the group to which the user currently belongs is different from the group upon initial printing but authentication for the file server 203 is not necessary, and thus the process advances to step S907 to execute reprinting.

Note that in the first embodiment, if it is determined in step S906 that authentication for the file server 203 is not necessary, the process advances to step S907 to permit reprinting. However, if the user currently belongs to a group different from that upon initial printing, reprinting may be prohibited. More specifically, if NO is determined in step S906, the process may be terminated without performing reprint processing.

Processing in steps S804 to S808 corresponds to authentication processing in the file server 203, and is basically the same as that shown in FIG. 8. Only processing in step S806 is different and thus will be described. If it is determined in step S806 that authentication for the file server 203 has succeeded, the process advances to step S907, and the CPU 101 obtains the print settings and printing image data from the history manager 309, thereby executing reprinting. More specifically, the CPU 101 instructs the image processor 308 to perform image processing according to the obtained print settings, as described above. After the image processor 308 completes the processing of the printing image data, the CPU 101 instructs the image output controller 303 to output the image data. The image output controller 303 causes the storage controller 304 to read out the image data having undergone the image processing from the RAM 102 or HDD 104, and outputs it to the printer 109 via the system bus 111 and device I/F 107. The printer 109 sequentially prints images on sheets based on the image data. Although reprinting is executed using the print settings saved by the user upon initial printing in the flowchart shown in FIG. 9, the user may set different print settings, and execute reprinting according to the set print settings.

A case in which it is determined in step S900 whether to confirm a group to which the user belongs has been described. Instead of the processing in step S900, however, a group to which the user belongs may be forcibly confirmed for reprinting of data in the file server 203. In the following embodiment, a description based on the flowchart shown in FIG. 9 assumes that the processing in step S900 is not executed.

In the flowchart shown in FIG. 9, after determining in steps S902 to S904 whether the group to which the user belonged in initial printing coincides with the group to which the user currently belongs, the CPU 101 connects to the file server 203. As another example, however, if data in the file server 203 is reprinted without performing the processing in steps S902 to S904, the CPU 101 may inquire, of the file server 203, and confirm whether the user groups coincide with each other every time.

Furthermore, if it is determined in step S806 of the flowchart shown in FIG. 9 that authentication has succeeded, the process advances to step S907 to execute reprinting. As another embodiment, however, right information of the data in the file server 203 is confirmed, and reprinting may not be permitted unless the user has a necessary right. For example, it is confirmed whether the user has a read right for a data file in the file server 203. At this time, the presence/absence of the data file in the file server 203 can be determined even though the user has no read right for the data. Therefore, it is confirmed whether the user is given a read right for the data file to load contents of the data file. Only if the user has the read right, reprinting of the data file may be executed in response to an instruction from the user.

As a practical example, reprinting of data in the file server 203 will be further described.

Assume that the user with the user ID "yamada" prints data in a file server from the image forming apparatus 202. More specifically, the user connects to a file server "¥¥192.168.3.5" using the CIFS protocol, and prints "¥share¥a.pdf" at 2011.1.5 17:33.29. As indicated by the aforementioned history information 503 shown in FIG. 5A and history information 507 shown in FIG. 5B, printing information of the user ID "yamada" is stored as history information. More specifically, because of printing of the data in the file server 203, the history information 503 of FIG. 5A is stored. The job type, the date/time when printing was executed, and the user ID of the user who operates the image forming apparatus 202 are "NET", "2011.1.5 17:33.29", and "yamada", respectively. The print settings used in printing are saved as "00111.setting" in a directory "/history/printsetting". Furthermore, the image data used for printing is saved as "00111.1 mg" in a directory "/history/printdata". As described above, these save destinations are merely examples for a description of the present invention, and other save destinations may be possible. Moreover, because of printing of the data in the file server 203, "28" is stored as an external file attribute ID to save additional information in the history information.

The additional history information 507 of FIG. 5B corresponds to the history information 503 of FIG. 5A, and stores history information with the ID "28" regarding the file server 203 which holds the printed data. In FIG. 5B, the referenced URL stores the URL "¥¥192.168.3.5¥share¥a.pdf" of the printed data, and the protocol for connecting to the file server 203 stores "CIFS". Information such as the update date/time and file size of the file is also stored. Furthermore, user information for access to the file server 203 is stored. In this example, "taro" is stored as the user ID. This user ID is different from the user ID "yamada" of the corresponding job recorded in FIG. 5A. The user ID "yamada", however, is a user ID for using the image forming apparatus 202, and thus need not be the same as the user ID for the file server 203. That is, the user who uses the image forming apparatus 202 with the user ID "yamada" is authenticated using the ID "taro" for the file server 203, and accesses the file server 203. As described above, this field may store a password and the like in addition to the ID for access to the file server 203. Information about a group to which the user with the user ID "taro" for the file server 203 belongs is also stored. In this example, the user belongs to two groups: a sales department (salesdept) and Tokyo head office (Tokyo Head Office).

Assume that the user designates the print history and instructs reprinting. In this case, it is apparent that if the user who instructed reprinting belongs to the same group as that of the history information, the determination result in step S904 of FIG. 9 described above permits reprinting. A case in which the group to which the user who instructed reprinting currently belongs is different from that of the history information will be described below.

Assume that the group to which the user who instructed reprinting belongs was changed from the sales department (sales-dept) to the personnel department (personnel-dept), and these two groups have no nested structure. In this case, it is determined in step S904 of FIG. 9 that the groups are different from each other, and the file server 203 executes authentication processing. If it is confirmed in the authentication processing that the user can access a file described in the referenced URL, reprinting can be executed. In this case, the user is authenticated to access data in the file server 203 but the image data stored in the image forming apparatus 202 is used to reprint instead of obtaining again the data from the file server 203. This eliminates the need for processing of transferring the image data via the network 201.

As another example, assume that two sub-groups including a corporate sales department group (corporate sales-dept) and a personal sales department group (personal sales-dept) are created in the sales department group (sales-dept). That is, the sales department group has a nested structure in which the sales department group includes the corporate sales department group and personal sales department group. Assume also that a group to which the user with the ID "taro" is then changed from the sales department group to the corporate sales department group. In this case, if the user tries to execute reprinting, it is determined in step S904 of FIG. 9 that the group to which the user currently belongs is different from that to which the user belonged in initial printing. It is, however, determined that the group of the user in initial printing includes the group to which the user currently belongs, thereby permitting reprinting by the user.

Note that in the first embodiment, the use of the history information in reprinting has been described. The present invention, however, is not limited to print processing, and is applicable to any function of the image forming apparatus. For example, the present invention is applicable to a case in which the image forming apparatus is to obtain a data file in a file server, and transmit it by FAX.

As described above, according to the first embodiment, if the group to which the user belonged in initial printing is different from the group to which the user who instructed reprinting currently belongs, authentication is required of the user. This can prevent reprinting of a document that cannot be accessed by the group to which the user currently belongs, when the group to which the user currently belongs is different from the group of the user in last printing.

[Second Embodiment]

The second embodiment of the present invention will be described. Note that the arrangement of a system, an image forming apparatus 202, a server, and the like according to the second embodiment is the same as that in the aforementioned first embodiment, and a description thereof will be omitted. A case in which a file server 203 or a directory in the file server 203 which restricts reprinting based on history information is designated in advance will be explained. A description of the same parts as those in the first embodiment will be omitted.

More specifically, for example, if "¥¥192.168.3.5" is designated as a file server for which reprinting is restricted, reprinting based on print histories of all data in the file server "¥¥192.168.3.5" is restricted. If a directory "¥¥192.168.3.5¥secret" in the file server is designated, reprinting based on print histories of data in the directory "¥secret" in the file server "¥¥192.168.3.5" is restricted. Note that although a file server is designated by an IP address, any information such as a host name for uniquely specifying a file server may be used. If a directory in a file server is designated, reprinting is restricted for only data files in the designated directory excluding files in its subdirectories rather than all files in the directory.

It is determined, when storing history information upon initial printing, whether reprinting based on the data is restricted, or it is determined, when reprinting is executed, whether reprinting of data of a print source stored in history information is restricted. It may be confirmed, in initial printing and reprinting, whether reprinting of the data is restricted. With this operation, even if a file server or directory for which reprinting is restricted is changed, it is possible to confirm, in initial printing and reprinting, whether data is in the file server or directory for which reprinting is restricted. Note that in the second embodiment, it is determined, in initial printing and reprinting, whether reprinting of data is restricted. However, it may be confirmed, in one of initial printing and reprinting, whether reprinting of data is restricted.

Figure 10A:
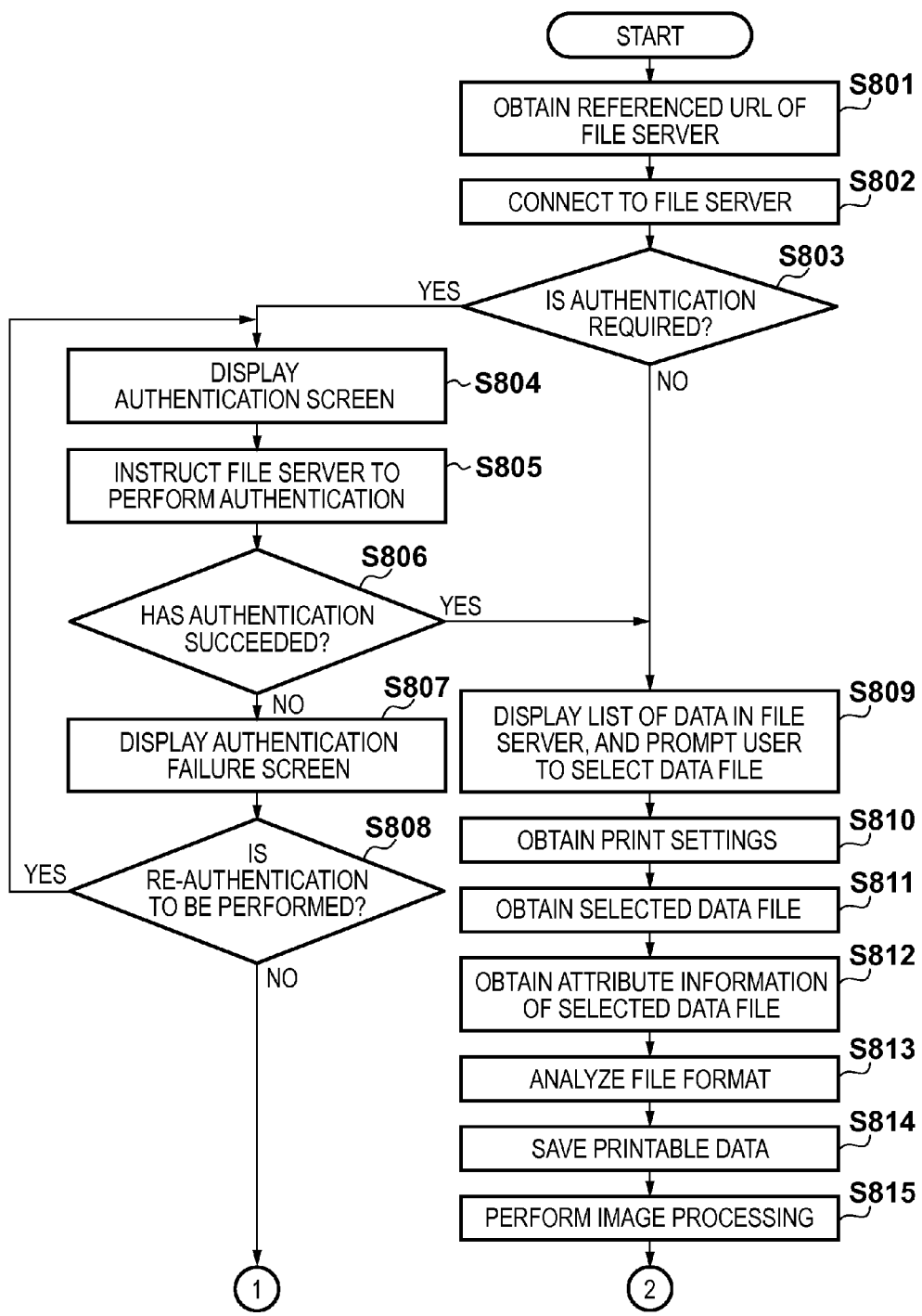
FIGS. 10A and 10B are flowcharts for describing processing which is executed by an image forming apparatus according to a second embodiment to obtain and print image data from a file server connected to a network, and save history information.
Figure 10B:
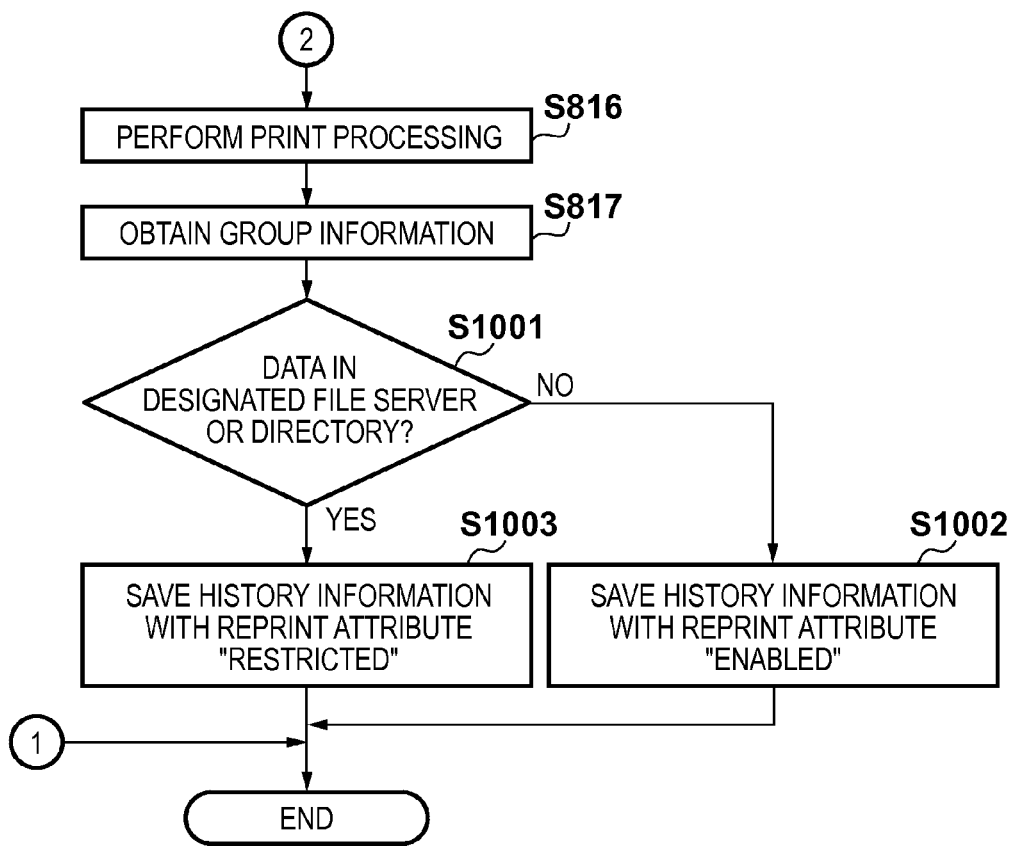

FIGS. 10A and 10B are flowcharts for describing processing which is executed by the image forming apparatus 202 according to the second embodiment to obtain and print image data in the file server 203 connected to a network 201, and save history information. A program which executes this processing is stored in a ROM 103 or HDD 104, deployed on a RAM 102 in execution, and executed under the control of a CPU 101. Note that the same processes in FIGS. 10A and 10B as those in the flowchart shown in FIG. 8 have the same reference symbols, and a description thereof will be omitted.

After a network controller 310 obtains information about a group to which the user belongs in step S817, the process advances to step S1001 (FIG. 10B). In step S1001, the CPU 101 confirms whether printed data is saved in the designated file server 203 or directory. If the printed data is data in the designated file server 203 or directory, the process advances to step S1003; otherwise, the process advances to step S1002. In step S1002, the printed data is not data in the designated file server 203 or directory, and thus the CPU 101 saves history information with a reprint attribute (to be described later with reference to FIG. 12) "enabled". Note that the items other than the reprint attribute of the history information saved in step S1002 are the same as those described in step S818. On the other hand, in step S1003, the printed data is data in the designated file server 203 or directory, and thus the CPU 101 saves history information with a reprint attribute "restricted". The items other than the reprint attribute of the history information saved in step S1003 are the same as those described in step S818. The reprint attribute is used to set whether to restrict reprinting based on the history information.

FIG. 12 depicts a view illustrating an example of a history management table according to the second embodiment. Note that a description of the same parts in FIG. 12 as those in FIG. 5A will be omitted.

In this example, a reprint attribute 1201 is added to a history management table. If the value of the reprint attribute is "enabled", reprinting is permitted. If the value is "restricted", reprinting is restricted. If the value is "disabled", reprinting is not permitted. Referring to FIG. 12, pieces of history information 1202 to 1205 have a reprint attribute "enabled", and thus reprinting is permitted. History information 1206 has a reprint attribute "disabled", and thus reprinting cannot be executed. Furthermore, history information 1207 has a reprint attribute "restricted", and thus a restriction is imposed so that a group to which a user belongs is confirmed when the user instructs reprinting. A reprint attribute is provided in history information to restrict reprinting in the second embodiment. However, for example, if execution of reprinting is not permitted, no history information may be stored. In this case, the processing in step S1002 in the flowchart shown in FIG. 10B is omitted, and the processing in step S1003 is the same as that in step S818 of FIG. 8.

Figure 11A:
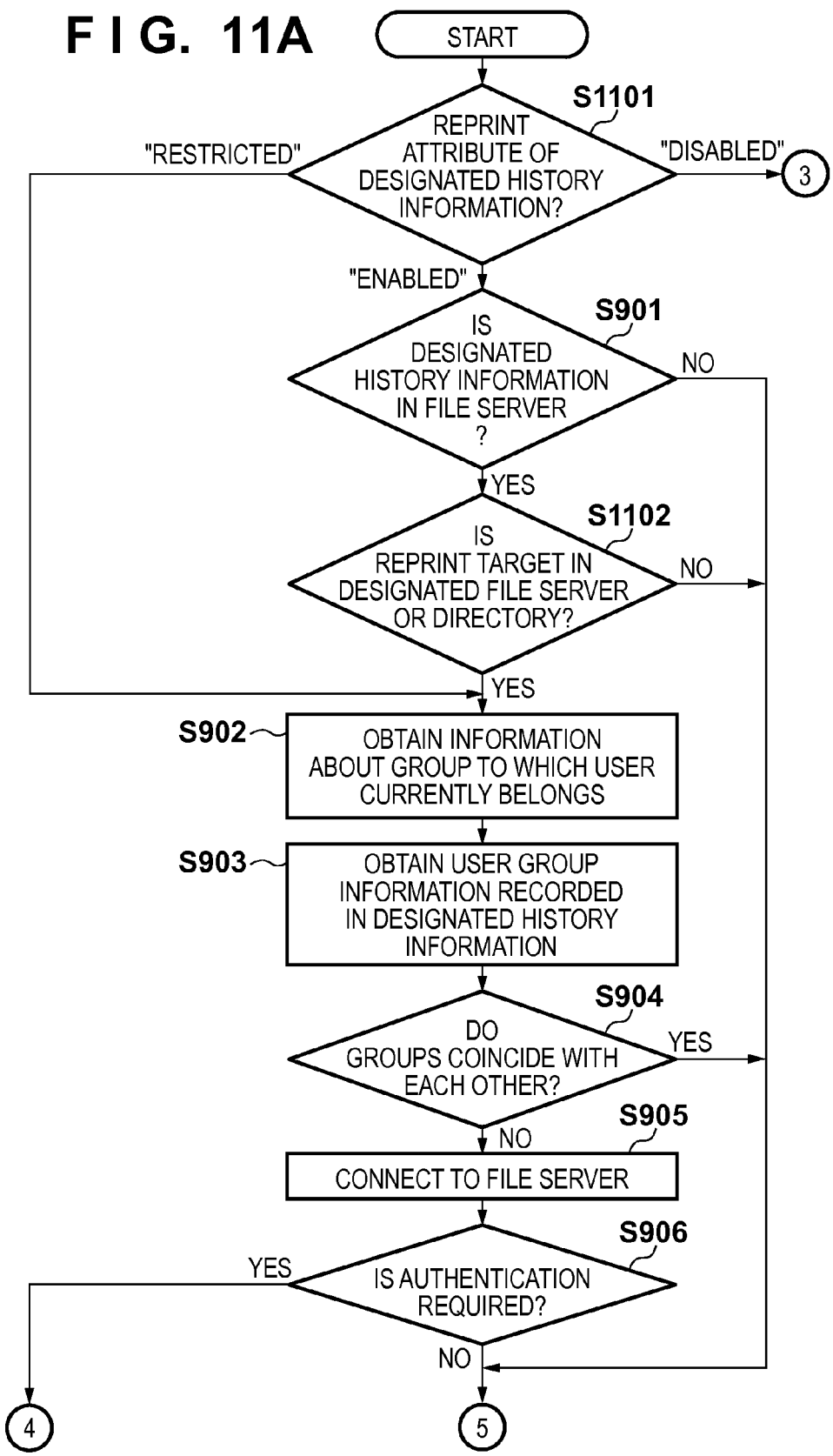

FIGS. 11A and 11B are flowcharts for describing processing which is executed by the image forming apparatus 202 according to the second embodiment when the user instructs reprinting based on history information. A program which executes this processing is stored in the ROM 103 or HDD 104, deployed on the RAM 102 in execution, and executed under the control of the CPU 101. Note that the same processes in FIGS. 11A and 11B as those in the flowchart shown in FIG. 9 have the same reference symbols, and a description thereof will be omitted.

In step S1101, the CPU 101 obtains history information designated for reprinting from a history manager 309, and confirms the reprint attribute 1201 of the designated history information. If it is determined in step S1101 that the reprint attribute is "disabled", reprinting based on the history information is not permitted, thereby terminating the process. If it is determined in step S1101 that the reprint attribute is "enabled", the process advances to step S901. If it is determined in step S1101 that the reprint attribute is "restricted", the process advances to step S902. Note that if it is determined in step S1101 that the reprint attribute is "disabled", the process is terminated in the second embodiment. However, for example, re-authentication may be forcibly performed for the file server 203.

In step S901, the CPU 101 determines whether the designated history information is a print history of a data file in the file server 203. If it is determined in step S901 that the designated history information is a print history of a data file in the file server 203, the process advances to step S1102; otherwise, re-authentication processing for the file server 203 is not required, and thus the process advances to step S907. In step S1102, the CPU 101 determines whether the data to be reprinted is data saved in the designated file server 203 or directory. If it is determined in step S1102 that the data to be reprinted is data in the designated file server 203 or directory, it is necessary to confirm a group to which the user belongs, and thus the process advances to step S902. On the other hand, if it is determined in step S1102 that the data to be reprinted is not data in the designated file server 203 or directory, it is not necessary to confirm a group to which the user belongs, and thus the process advances to step S907 (FIG. 11B).

Note that in the second embodiment, if it is determined in step S1102 that the data to be reprinted is data in the designated file server 203 or directory, a group to which the user belongs is confirmed; otherwise, reprinting is permitted. If, however, the data to be reprinted is data in the designated file server 203 or directory, no reprinting may be permitted. In this case, if YES is determined in step S1102, the process advances to step S1105 (FIG. 11B), and "disabled" is set in the reprint attribute 1201 so as not to permit reprinting. If NO is determined in step S1102, the process advances to step S902, and a group to which the user who instructed reprinting belongs is confirmed.

In step S806, the CPU 101 receives an authentication result from the file server 203, and determines whether authentication executed in step S805 has succeeded. If it is determined in step S806 that authentication has succeeded, the process advances to step S1103. If it is determined in step S806 that authentication has failed, the process advances to step S807. In step S1103, based on authentication information input by the user, the CPU 101 obtains information about the group to which the user belongs. Note that this processing is the same as that in step S817. The process then advances to step S1104, and the CPU 101 updates the history information by replacing the user group information of the designated history information with the user group information obtained in step S1103. With this processing, if reprinting of the data is instructed next, the groups coincide with each other unless the group to which the user belongs is further changed, thereby eliminating the need for re-authentication of the user for the file server 203.

Note that in the second embodiment, history information regarding the data is updated in steps S1103 and S1104. However, the user may be authenticated every time without updating the history information, as a matter of course. The history manager 309 may replace the group information of all the pieces of history information regarding printing of data files in the same file server or directory by the same user ID and user information. This eliminates the need for user authentication in reprinting of another data in the same file server or directory.

After it is determined in step S806 that authentication has failed, the CPU 101 determines in step S808 whether execution of re-authentication has been instructed. If it is determined in step S808 that execution of re-authentication has been instructed, the process returns to step S804, and an authentication screen is displayed again. On the other hand, if it is determined in step S808 that re-authentication is not to be performed, the process advances to step S1105, and the CPU 101 updates the history management table by setting "disabled" in the reprint attribute of the history information of the data because authentication has failed. With this processing, the data is no longer a reprint target, and is excluded from reprint candidates. Although data is excluded from reprint targets by setting "disabled" in the reprint attribute in the second embodiment, the history information regarding the data may be deleted.

According to the second embodiment, it is possible to designate, in advance, the file server 203 or a directory in the file server 203 for which reprinting using history information is restricted, thereby restricting reprinting of data in the file server 203 or the directory in the file server 203. Furthermore, even if a group to which the user belonged in initial printing is different from that to which the user belongs in reprinting, reprinting can be executed by a user instruction for data which has low confidentiality and is not stored in a file server or the like for which reprinting is restricted.

Moreover, it is possible to designate data which cannot be a reprint target, and exclude the data from reprint targets by providing a reprint attribute in history information, and updating the history information as needed.

[Third Embodiment]

The third embodiment of the present invention will be described. Note that the arrangement of a system, an image forming apparatus 202, a server, and the like according to the third embodiment is the same as that in the aforementioned first and second embodiments, and a description thereof will be omitted. A case in which only referenced URL information is stored as history information of data in a file server 203 and image data used for printing is not stored as history information will be explained. This is done to reduce a required memory capacity of an HDD 104 of the image forming apparatus 202. A description of the same parts as those in the first embodiment will be omitted.

A case in which only referenced URL information is stored as history information without storing image data used for printing will be described first.

FIGS. 14A and 14B depict views illustrating examples of a history management table according to the third embodiment. Note that FIGS. 14A and 14B correspond to FIGS. 5A and 5B, respectively, and only the difference from FIGS. 5A and 5B will be described.

Referring to FIG. 14A, pieces of history information 1401 and 1402 with a job type "NET" indicate history information of printing of data in the file server 203. The printing image data save destination of the history information is "–", which indicates that the data used for printing is not saved in the image forming apparatus 202. FIG. 14B shows a table of additional history information for a data file in the file server 203 on the network 201, which can be traced using an external file attribute ID. User information in the additional history information table stores not only the ID of a user of the file server 203 but also password information. This information has undergone encryption, hashing, and the like, as a matter of course. Although the user information includes only an ID and password in the third embodiment, other information necessary for access to the file server 203 may be stored. If, for example, domain information is necessary, the user information of the additional history information table also stores the domain information.

Figure 13A:
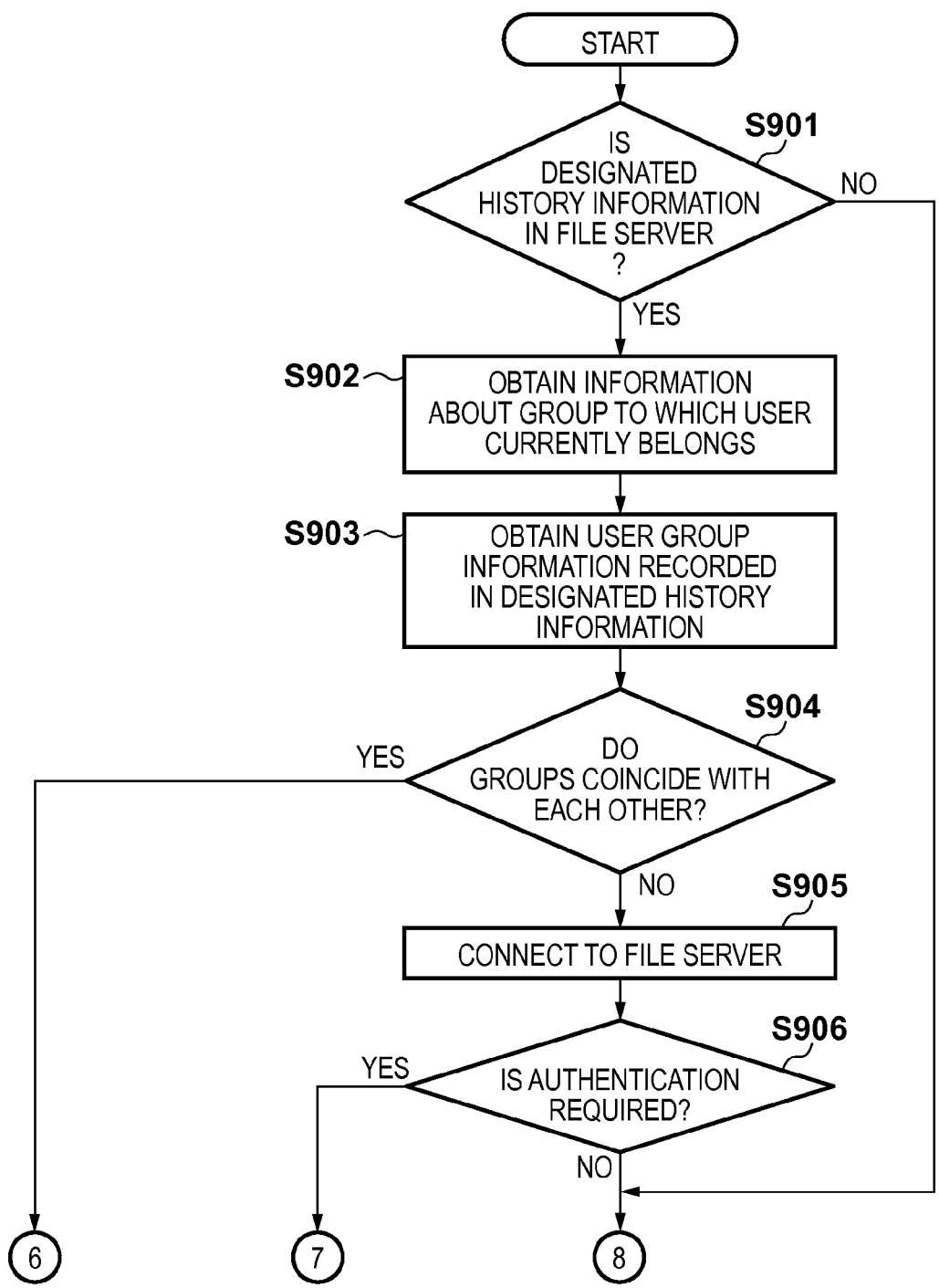
FIGS. 13A and 13B are flowcharts for describing processing which is executed by an image forming apparatus according to the third embodiment when the user instructs reprinting based on history information.
Figure 13B:
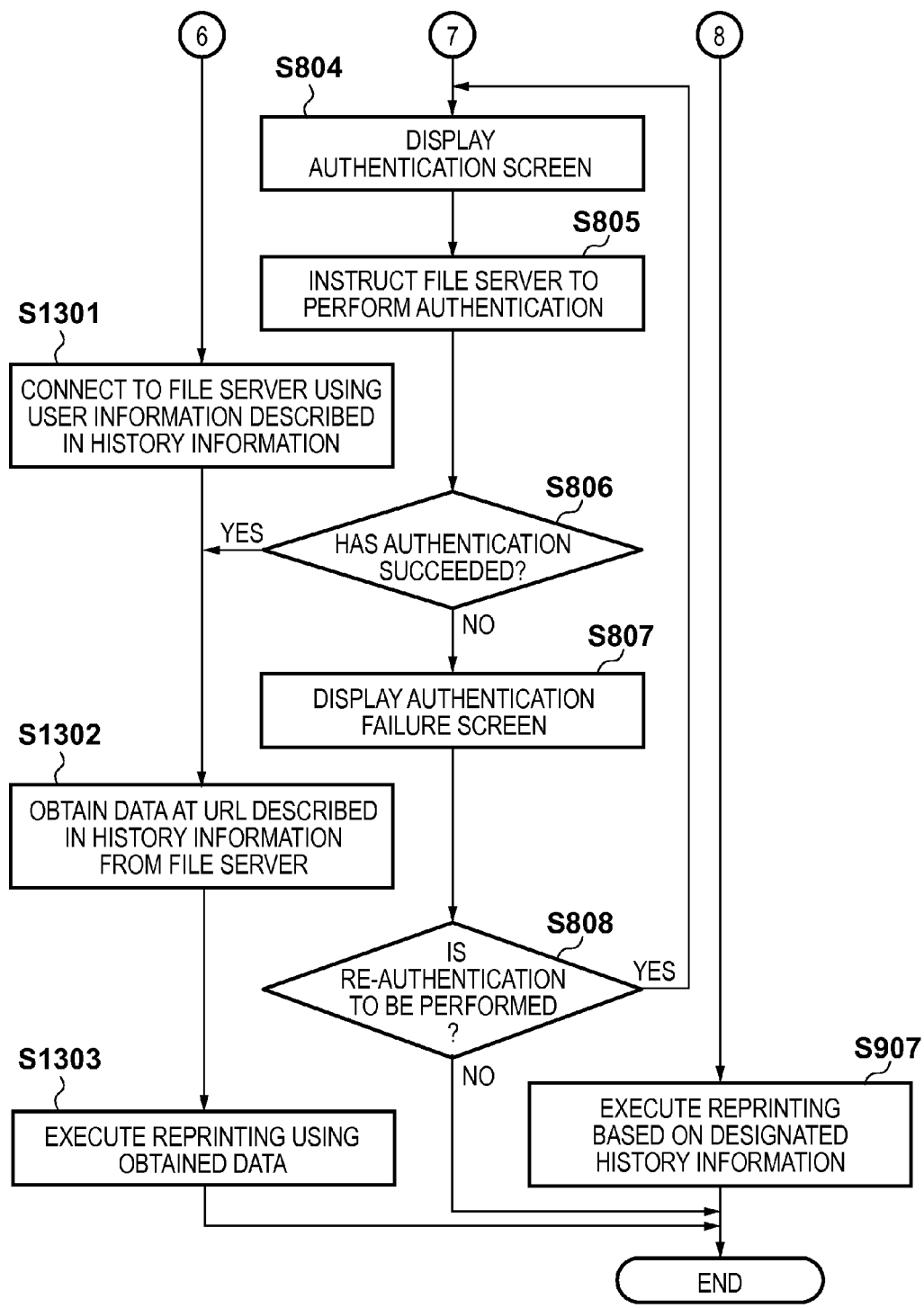

FIGS. 13A and 13B are flowcharts for describing processing which is executed by the image forming apparatus 202 according to the third embodiment when the user instructs reprinting based on history information. A program which executes this processing is stored in a ROM 103 or the HDD 104, deployed on a RAM 102 in execution, and executed under the control of a CPU 101. Note that the same processes in FIGS. 13A and 13B as those in the flowchart shown in FIG. 9 have the same reference symbols, and a description thereof will be omitted.

In step S904, the CPU 101 compares information, obtained in step S902, about a group to which the user currently belongs with user group information upon initial printing obtained in step S903, thereby determining whether the groups coincide with each other. Note that the group determination is the same as that in step S904 according to the first embodiment. If it is determined in step S904 that the groups coincide with each other, the user belongs to the same group as that upon last printing, it is thus determined that re-authentication is not necessary, and the process advances to step S1301 (FIG. 13B). On the other hand, if it is determined in step S904 that the groups do not coincide with each other, re-authentication is required, and thus the process advances to step S905.

In step S1301, the CPU 101 obtains, from a history manager 309, user information (ID and password) of the file server 203 of history information, which is stored in the history information, and connects to the file server 203 via a network controller 310, and the process advances to step S1302. If it is determined in step S806 that authentication has succeeded, the process also advances to step S1302. In step S1302, the CPU 101 obtains, via the network controller 310, image data from the referenced URL of the history information, which is stored in the history information. The process advances to step S1303, and the CPU 101 obtains the print settings of the history information from the history manager 309, and executes reprinting using the image data obtained in step S1302. In step S1303, the image data obtained from the file server 203 in step S1302 is used instead of the printing image data obtained from history information in step S907 of the flowchart shown in FIG. 9, and the processing in step S1303 is the same as that in step S907 except for an image data obtaining destination.

As described above, according to the third embodiment, if, in reprinting of data in a file server, a group to which the user belonged in initial printing is different from that to which the user who instructed reprinting currently belongs, reprinting can be executed only after performing re-authentication. Since the image forming apparatus saves no image data for printing, if the groups coincide with each other, it is possible to access the file server using the user information of the user, and obtain image data for reprinting to reprint.

In the above-described embodiment, the history information stored in the history management table is information when the user initially executed printing. The present invention, however, is not limited to this, and any history information upon at least immediately preceding (or past) printing may be stored.

In the above-described first to third embodiments, reprint processing in the image forming apparatus has been exemplified. The present invention, however, is not limited to this, and is also applicable to a case in which user data stored in an information processing apparatus such as a PC is reused.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147595, filed Jun. 29, 2012, which is hereby incorporated by reference herein in its entirety.

What is claimed is:

1. An image forming apparatus comprising:
   an obtaining unit configured to obtain a file from a file server in a case where an authentication in the file server succeeds;
   a first execution unit configured to execute a print job for printing the file obtained by the obtaining unit;
   a storage unit configured to store the file obtained by the obtaining unit as a file for reprinting and to store print history information of the print job executed by the first execution unit, the print history information containing at least user identification information of a user who instructed execution of the print job;
   a second execution unit configured to, in a case that a reprinting of the file is instructed by a user, based on the print history information, execute a print job for reprinting the file stored in the storage unit without obtaining the file from the file server; and
   a determination unit configured to compare user identification information of the user who instructed the reprinting of the file with user identification information contained in the print history information for the print job of the file and determine, based on a comparison result, whether the execution of the print job by the second execution unit is permitted without authentication in the file server.

2. The apparatus according to claim 1, wherein the file stored in storage unit for reprinting includes data generated by converting the file obtained by the obtaining unit into a printable format.

3. The apparatus according to claim 1, wherein the print history information of the print job contains at least identification information of the print job and information about a group to which the user belongs, that correspond to the user identification information contained in the print history information of the print job.

4. The apparatus according to claim 3, wherein
   the print history information of the print job further contains information indicating whether reprinting of the print job is enabled, disabled, or restricted, and the information indicates that reprinting is restricted in a case that the print job is a print job based on data stored in one of a designated external device and a specific directory in the external device, and
   if the information indicates that reprinting is restricted, the determination unit determines, in a case that authentication of the user who instructed the reprinting of the print job succeeds in the external device, that the reprinting of the print job based on the print history information of the print job is permitted.

5. The apparatus according to claim 3, wherein
   the print history information of the print job further contains a URL of the file server.

6. A control method of controlling an image forming apparatus, comprising:
   obtaining a file from a file server in a case where an authentication in the file server succeeds;
   executing a print job for printing the file obtained in the obtaining;
   storing, in memory, the file obtained by the obtaining as a file for reprinting and storing print history information of the print job executed in the executing, the print history information containing at least user identification information of a user who instructed execution of the print job;
   executing, based on the print history information, a print job for reprinting the file stored in the memory without obtaining the file from the file server, in a case that a reprinting of the file is instructed by a user;
   comparing user identification information of the user who instructed the reprinting of the file with user identification information contained in the print history information for the print job of the file; and
   determining, based on a result of the comparing, whether the execution of the print job for reprinting the file is permitted without authentication in the file server.

7. A non-transitory computer readable storage medium storing a program for causing a computer to execute a control method comprising:
   obtaining a file from a file server in a case where an authentication in the file server succeeds;
   executing a print job for printing the file obtained in the obtaining;
   storing, in memory, the file obtained in the obtaining as a file for reprinting and print history information of the print job executed in the executing, the print history information containing at least user identification information of a user who instructed the executing of the print job;

executing, based on the print history information, a print job for reprinting the file stored in the memory without obtaining the file from the file server, in a case that a reprinting of the file is instructed by a user;

comparing the user identification information of the user who instructed the reprinting of the file with user identification information contained in the print history information for the print job of the file; and determining, based on a result of the comparing, whether the execution of the print job for reprinting the file is permitted without authentication in the file server.

* * * * *